US009843792B2

(12) United States Patent
Ström et al.

(10) Patent No.: US 9,843,792 B2
(45) Date of Patent: Dec. 12, 2017

(54) MULTI-VIEW DISPLAY CONTROL

(71) Applicant: Telefonaktiebolaget L M Ericsson (publ), Stockholm (SE)

(72) Inventors: Jacob Ström, Stockholm (SE); Michael Huber, Sundbyberg (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 288 days.

(21) Appl. No.: 14/425,439

(22) PCT Filed: Apr. 2, 2014

(86) PCT No.: PCT/SE2014/050389
§ 371 (c)(1),
(2) Date: Mar. 3, 2015

(87) PCT Pub. No.: WO2015/152776
PCT Pub. Date: Oct. 8, 2015

(65) Prior Publication Data
US 2016/0219268 A1    Jul. 28, 2016

(51) Int. Cl.
*H04N 13/04*     (2006.01)
*G06F 3/01*      (2006.01)

(52) U.S. Cl.
CPC .......... *H04N 13/047* (2013.01); *G06F 3/012* (2013.01); *G06F 3/013* (2013.01);
(Continued)

(58) Field of Classification Search
CPC ............. H04N 13/047; H04N 13/0402; H04N 13/0445; H04N 13/0468; H04N 13/0475;
(Continued)

(56) References Cited

U.S. PATENT DOCUMENTS

| 6,049,424 A * | 4/2000 | Hamagishi | ......... G02B 27/2214 345/419 |
| 2010/0315492 A1* | 12/2010 | Baik | .................. H04N 5/23219 348/51 |

(Continued)

FOREIGN PATENT DOCUMENTS

| WO | WO 2005/091050 A1 | 9/2005 |
| WO | WO 2011/145031 A2 | 11/2011 |
| WO | WO 2013/144773 A2 | 10/2013 |

OTHER PUBLICATIONS

International Search Report, PCT Application No. PCT/SE2014/050389, dated Dec. 18, 2014.
(Continued)

*Primary Examiner* — Christopher Findley
(74) *Attorney, Agent, or Firm* — Sage Patent Group

(57) ABSTRACT

A multi-view display controller determines view angles for each view of a multi-view media content for each viewer watching a multi-view display. The view angles determined for a viewer collectively define a viewer cone that displays the views onto the viewer. Media data of the multi-view media content is output together with information of the determined view angles to the multi-view display in order to allow each viewer to have the same experience of displayed media content regardless of where the viewer is positioned relative to the multi-view display.

24 Claims, 9 Drawing Sheets

(52) U.S. Cl.
CPC ..... *H04N 13/0402* (2013.01); *H04N 13/0445* (2013.01); *H04N 13/0468* (2013.01); *H04N 13/0475* (2013.01); *H04N 13/0477* (2013.01); *H04N 13/0484* (2013.01); *H04N 13/0497* (2013.01); *H04N 13/0447* (2013.01); *H04N 13/0481* (2013.01); *H04N 2013/0461* (2013.01); *H04N 2013/0465* (2013.01)

(58) Field of Classification Search
CPC ........... H04N 13/0477; H04N 13/0484; H04N 13/0497; G06F 3/012; G06F 3/013
See application file for complete search history.

(56) References Cited

U.S. PATENT DOCUMENTS

| | | | |
|---|---|---|---|
| 2011/0006979 A1* | 1/2011 | Min | G02B 27/0093 345/156 |
| 2011/0310003 A1 | 12/2011 | de la Barré | |
| 2011/0310232 A1* | 12/2011 | Wilson | G09G 3/003 348/51 |
| 2013/0057159 A1* | 3/2013 | Pijlman | G02B 27/0093 315/154 |
| 2014/0028662 A1 | 1/2014 | Liao et al. | |
| 2015/0049176 A1* | 2/2015 | Hinnen | H04N 13/007 348/59 |
| 2015/0062311 A1* | 3/2015 | Malzbender | H04N 13/0418 348/51 |

OTHER PUBLICATIONS

Written Opinion of the International Searching Authority, PCT Application No. PCT/SE2014/050389, dated Dec. 18, 2014.
International Preliminary Report on Patentability, PCT Application No. PCT/SE2014/050389, dated Oct. 4, 2016.

* cited by examiner

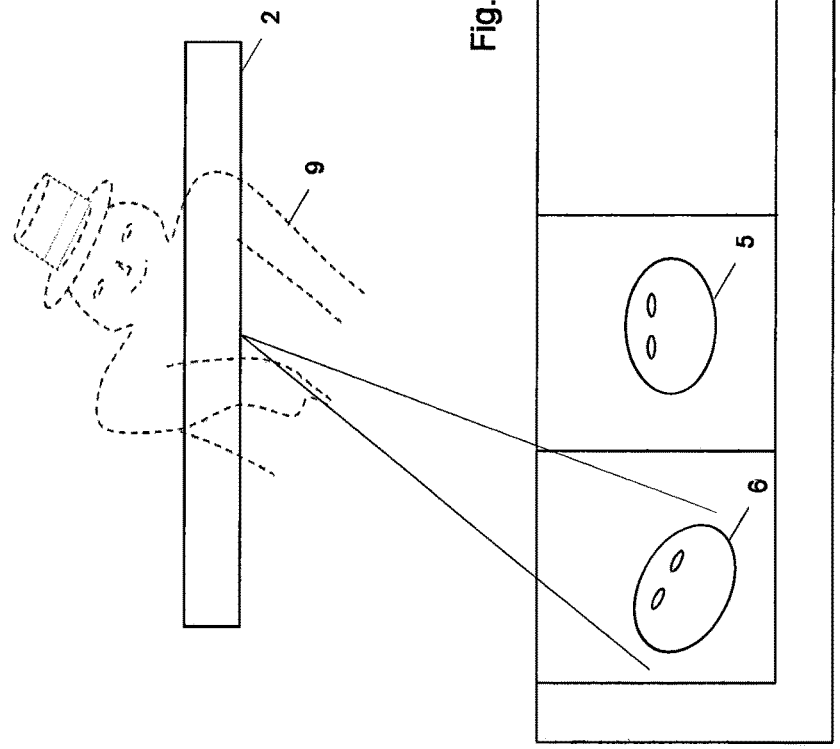
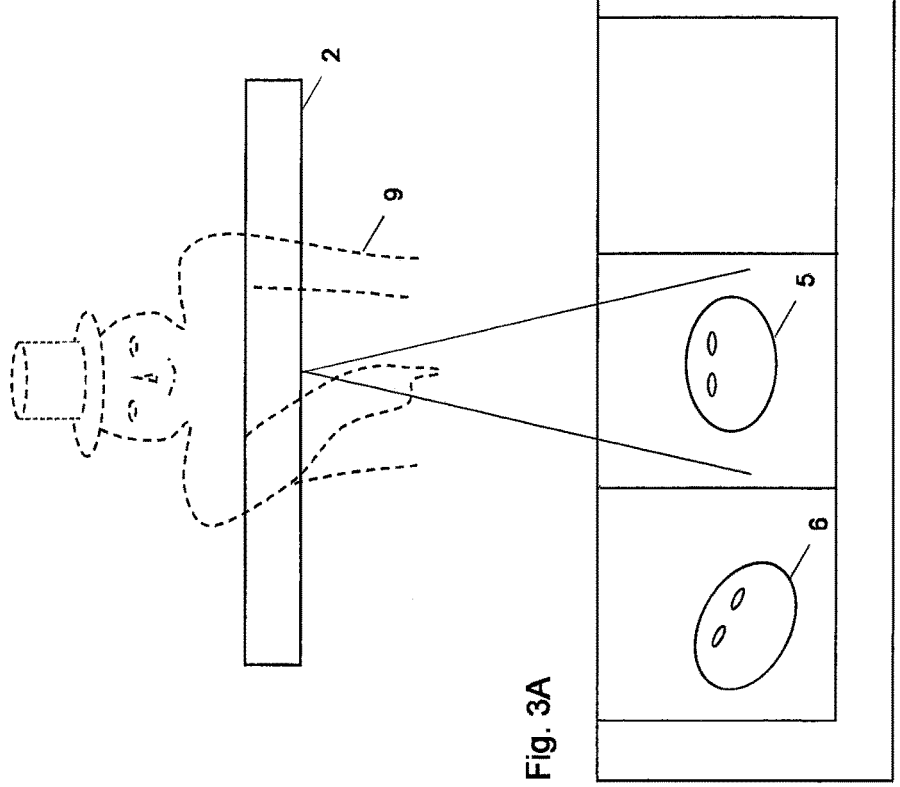

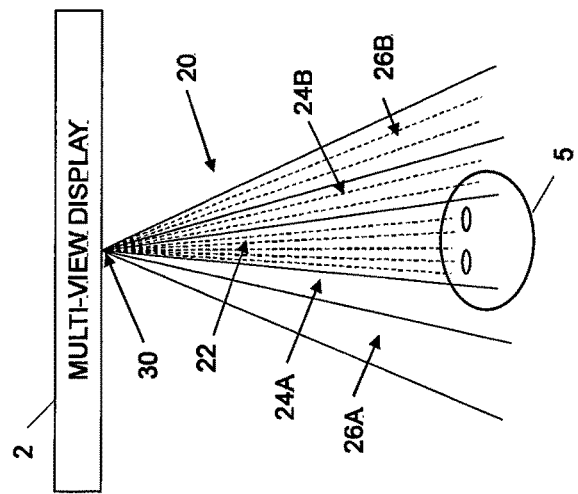
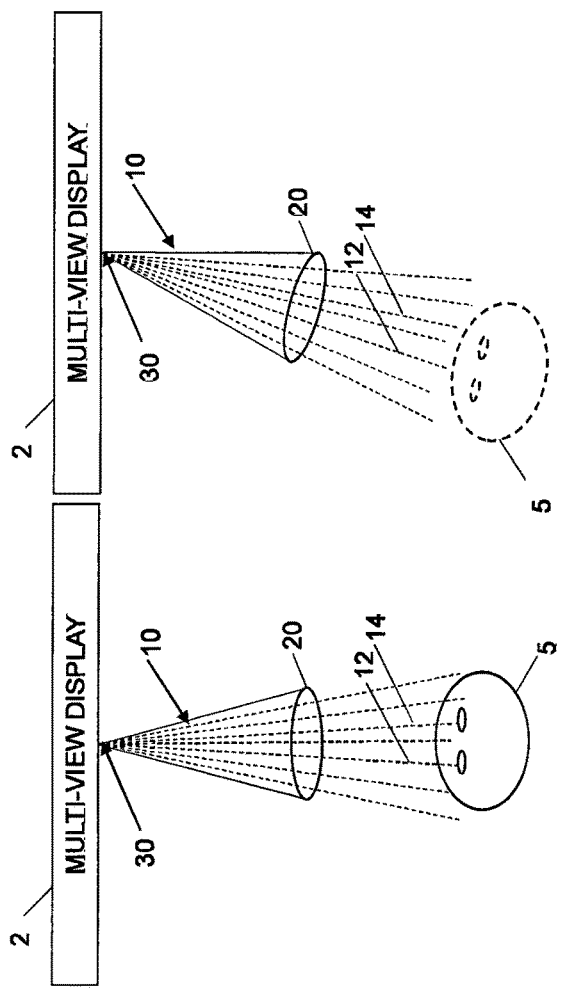

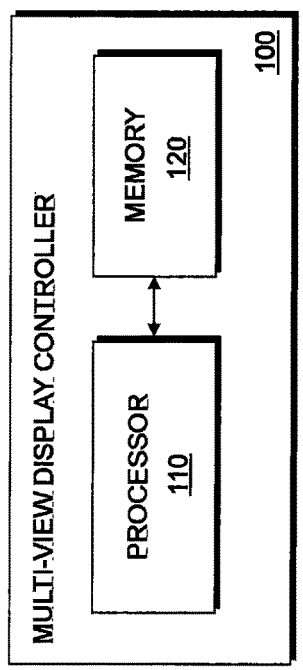
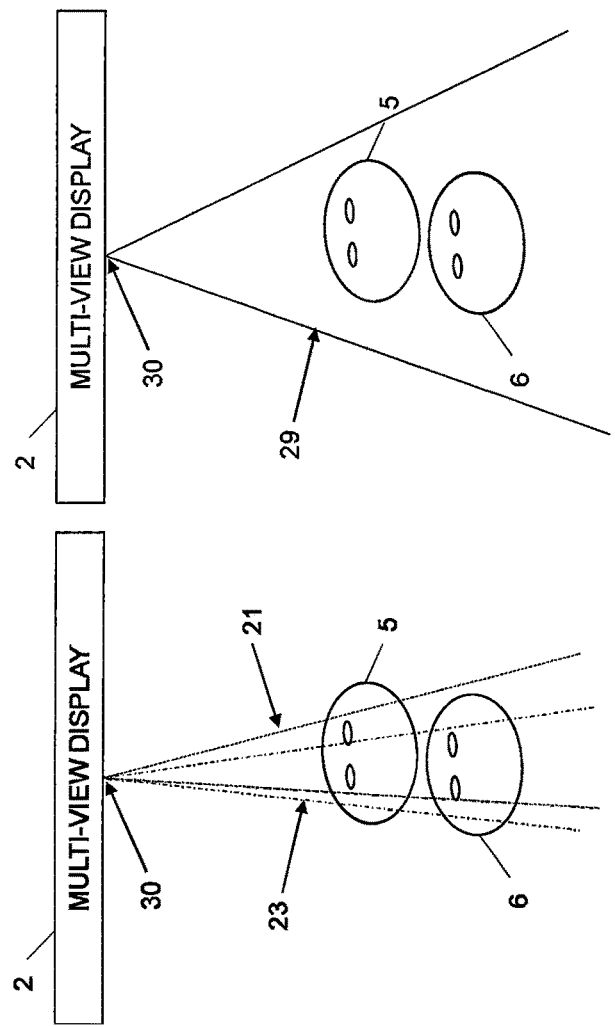
Fig. 10A
Fig. 10B
Fig. 11

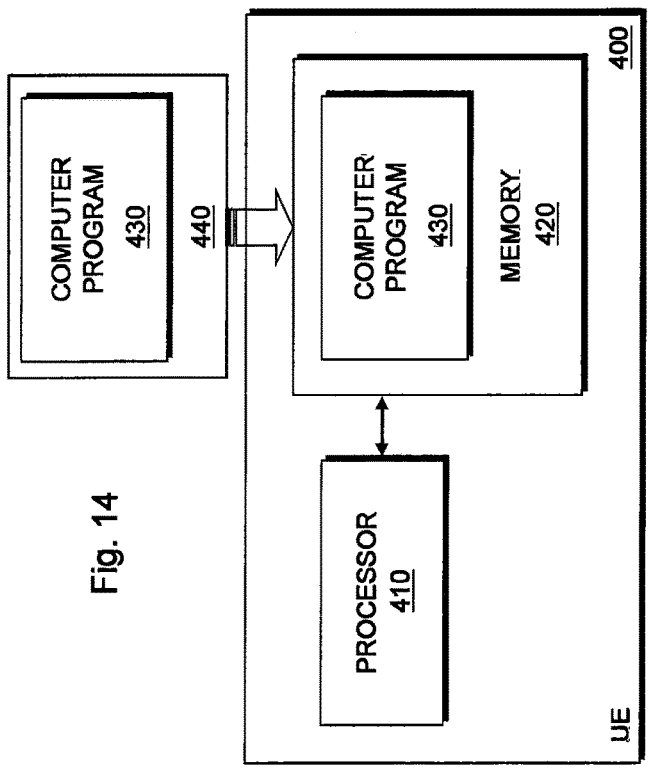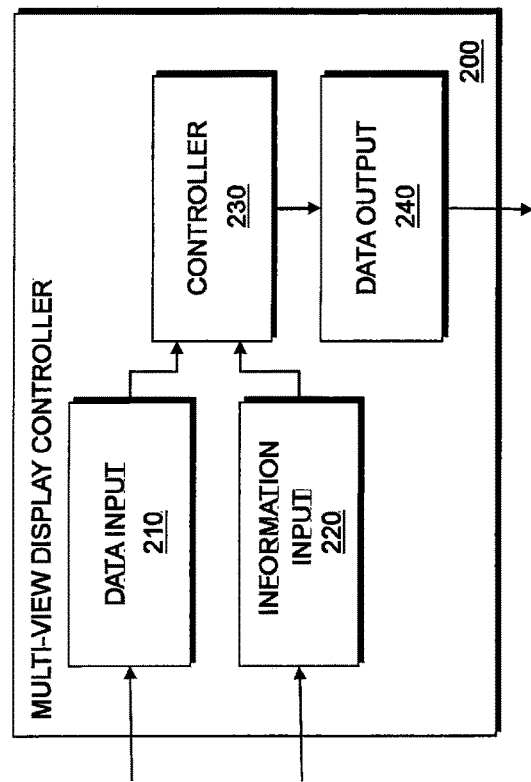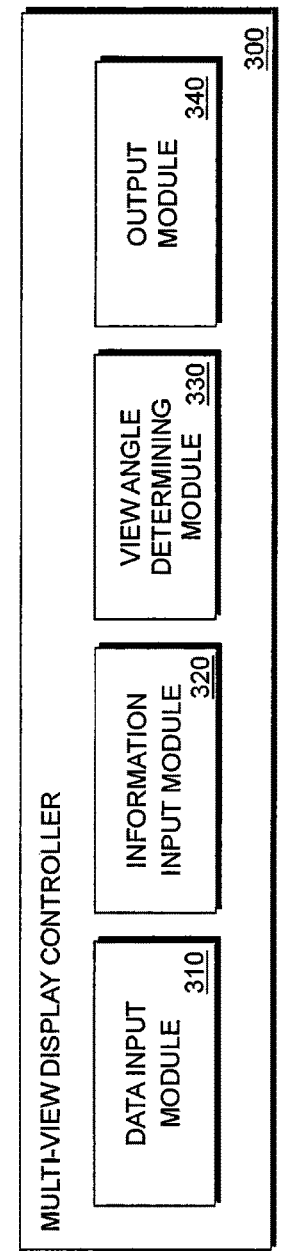

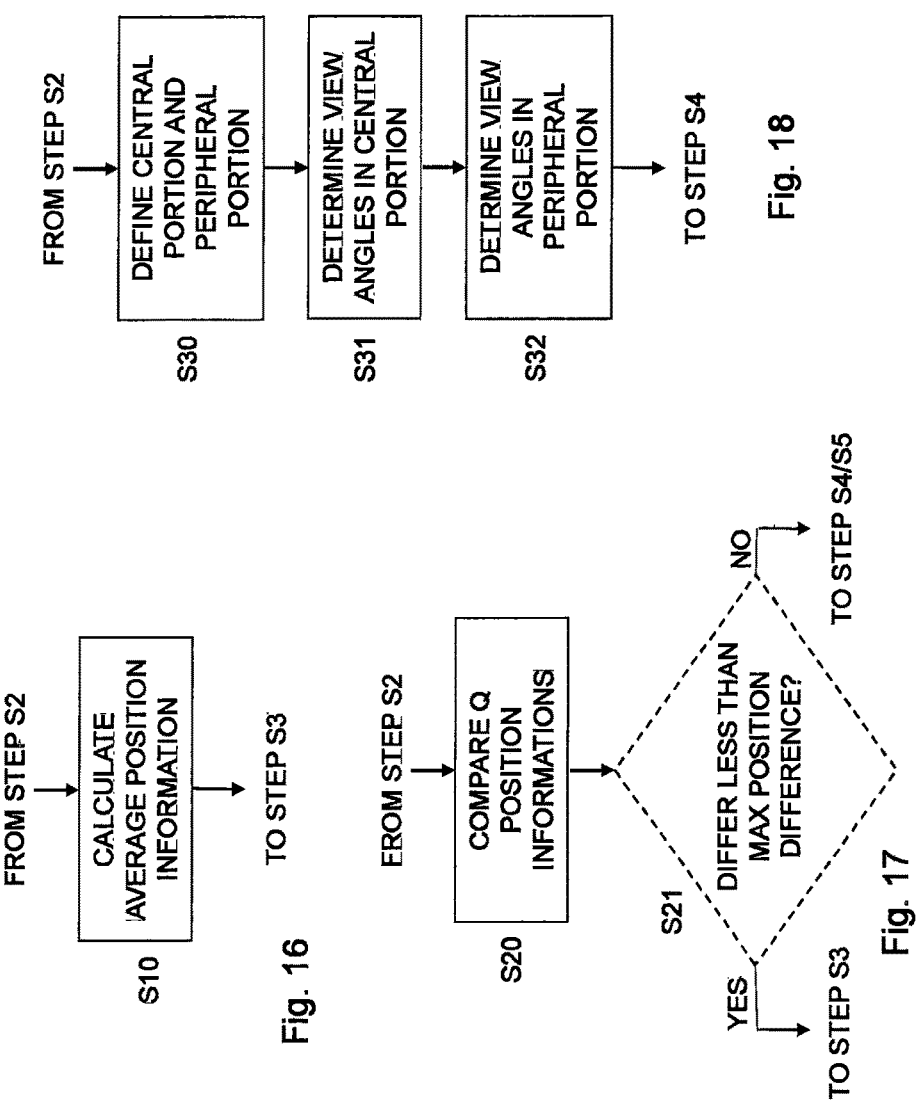
Fig. 18
Fig. 16
Fig. 17
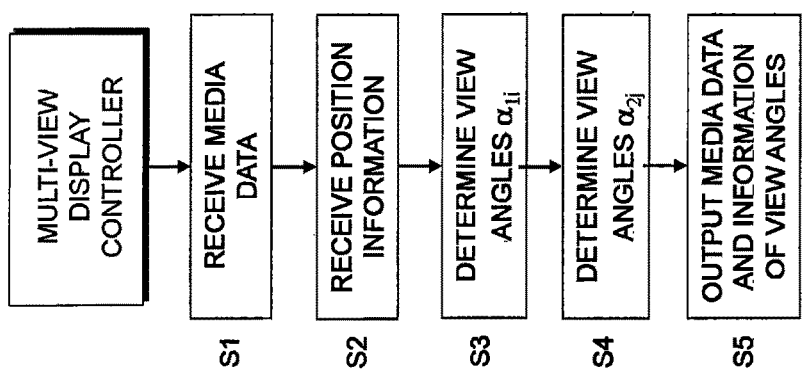
Fig. 15

MULTI-VIEW DISPLAY CONTROL

CROSS REFERENCE TO RELATED APPLICATION

This application is a 35 U.S.C. §371 national stage application of PCT International Application No. PCT/SE2014/050389, filed on 2 Apr. 2014, the disclosure and content of which is incorporated by reference herein in its entirety.

TECHNICAL FIELD

The present embodiments generally relate to multi-view display control, and in particular to controlling display of multi-view media content on a multi-view display.

BACKGROUND

3D TV systems that are on the market today are typically stereo-based: one image is presented to the left eye and another to the right eye. There are several ways to achieve this effect. For instance, polarizing filters can be used on every second row of the TV together with polarized glasses. Another way is to quickly alternate the left and the right image on the screen and have the user wear shutter glasses that are synchronized with the screen. Digital cinemas today often use a polarization filter in front of the projector. The filter can change direction every 120th of a second or more, which allows time multiplexing to work together with relatively inexpensive polarized glasses.

However, consumers do not like to wear glasses, and this may be the reason why 3D TV is now seen as a failure within the TV industry. Therefore new TV screens that do not require glasses are emerging.

Glasses free 3D display can be achieved by using a lenticular array in front of the screen. This makes it possible to make some pixels visible only from certain angles. In the simplest form, a lenticular display can be created to have every second column of pixels visible only by the left eye and the remaining columns only visible by the right eye. However, this requires the viewer to be positioned in a very tightly defined sweet spot in front of the display.

Another solution is to use steerable displays that rely on eye-tracking. By finding the position of each eye of the viewer, the display can control the lenticular array so that it is always sending the left image to the left eye and the right image to the right eye. If this is combined with rendering the content from the correct position the effect could be very convincing in theory.

A disadvantage with both of these types of two-view screens is that they can only be used by one viewer at a time, since there are only one sweet spot.

One way to get around the single viewer problem is to use a multi-view display. This is a display that is capable of sending out several different views in different view angles. For example, multi-view displays marketed by Dimenco are capable of sending out a viewer cone of 27 different views. This means that the viewer can move his/her head a bit within the viewer cone and does not need sit exactly in a sweet spot. However, there need to be several views between the eyes of the viewer otherwise both eyes will sometimes see the same view and there will be no 3D experience. Hence, the viewer cannot move the head very far from the sweet spot and outside of the viewer cone.

A further multi-view display solution is to use a very large viewer cone presenting different views at different view angles. One example is the Holografika display Holovizio 80WLT, which has about 85 different views spread over 180 degrees.

Whereas the Holografika display solves many of the drawbacks of other cone-based multi-view displays, it suffers from two major problems: content creation and storytelling/bad seating.

For content creation the problem is that in order to get really good data to feed to the system, you ultimately want to have one camera for every view that the multi-view display can display. An example of this is shown in FIG. 1. Herein, a camera rig 40 with 90 cameras 41 is used to capture the scene 9 and thereby produce 90 different images that can be sent out by a multi-view display at different view angles.

For instance, the left eye of a first viewer 5, see FIG. 2, will see the video captured from camera #44, the right eye will see camera #45, and a second viewer 6 will look at the video captured from cameras #20 and #21. Such a camera rig 40 comes with a number of drawbacks. Firstly, it is huge, which makes it hard to transport and to operate in confined spaces or in environments such as in a thick jungle. Secondly, all those cameras 41 makes the camera rig 40 expensive. Thirdly, the cameras 41 have to be calibrated relative to each other. For instance, the cameras 41 may be supposed to all be pointed at a point in space, but flexibilities in the camera rig 40 may cause them to deviate slightly from this. Even small such errors must be compensated for in software, and the bigger the camera rig 40 is, the harder it is to make it stable.

A related problem of using a camera rig 40 with many cameras 41 is that more raw data is needed than if simple 2D video were used. Compression can help a bit since many of the views are similar. However, with the compression techniques available today, the number of bits to provide an extra view does not go to zero with increasing number of views, instead bit rate increases linearly with the number of views.

The second problem has to do with storytelling. Assume you have a movie that wants to convey to you the feeling that you are asked to join the U.S. army. Uncle Sam is pointing directly at you, and saying "I want YOU for the U.S. army!". This is simple to film using a regular 2D camera: you just let the actor look straight into the camera, and perhaps point at it, when saying the phrase. The effect will be that anyone watching the 2D video will feel that Uncle Sam is looking straight at them, irrespectively of where they are in the room when watching. With a camera rig such as the one shown in FIG. 1 it is less straight-forward. Which camera 41 should the actor be pointing at? If he points at the middle camera, only the viewer sitting right in front of the multi-view display screen 2 (first viewer 5 in FIG. 2) will feel as if Uncle Sam is pointing and looking at him/her. Meanwhile, the second viewer 6, who is sitting off-center, will feel like Uncle Sam is pointing at someone else, i.e. at the first viewer 5, and will not feel exposed. This is because the second viewer 6 sees the output of one of the left cameras but the actor 9 is pointing towards the middle camera, see FIG. 1.

In summary, the more views used, the higher fidelity the end result will be, becoming a true holographic experience in the limit. However, as more views are added, more cameras 41 are needed for the camera rig 40, making it more complicated and expensive. In addition, more data needs to be stored and transmitted. Perhaps worst of all, an increased number of views does not solve the storytelling problem, namely that the viewers 5, 6 get different experiences depending on where they sit in front of the multi-view display 2.

Hence, there is room for the improvement within the field of multi-view displays.

SUMMARY

It is a general objective to provide an efficient multi-view display control.

It is a particular objective to enable each viewer to get substantially a same experience of displayed media content regardless of the actual position of the viewer relative to a multi-view display.

These and other objectives are met by embodiments disclosed herein.

An aspect of the embodiments relates to a multi-view display controller configured to receive media data of at least a first media content. The multi-view display controller is also configured to receive, from a positioning device and for each viewer of at least a first viewer and a second viewer, position information representing a position of the viewer relative to a multi-view display. The multi-view display controller is further configured to determine, based on the position information for the first viewer and for at least a first pixel area of the multi-view display, a respective view angle $\alpha_{1i}$ for each view $V_{1i}$ of the first multi-view media content. The respective view angles define a first viewer cone displaying the views of the first multi-view media content onto the first viewer. In an embodiment, i=1 ... N and N≥5. The multi-view display controller is additionally configured to determine, based on the position information for the second viewer and for at least the first pixel area, a respective view angle $\alpha_{2j}$ for each view $V_{1j}$ of the first multi-view media content or for each view $V_{2j}$ of a second multi-view media content. In an embodiment, j=1 ... M and M≥5. The respective view angles define a second viewer cone displaying the views of the first multi-view media content or the second multi-view media content onto the second viewer. The multi-view display controller is further configured to output media data of the first multi-view media content or of the first multi-view media content and the second multi-view media content together with information of the respective view angles $\alpha_{1i}$, $\alpha_{2j}$ to the multi-view display for display of the first multi-view media content or for simultaneous display of the first multi-view media content and the second multi-view media content.

Another aspect of the embodiments relates to a multi-view display controller comprising a data input module for receiving media data of at least a first media content: The multi-view display controller also comprises an information input module for receiving, from a positioning device and for each viewer of at least a first viewer and a second viewer, position information representing a position of the viewer relative to a multi-view display. The multi-view display controller further comprises a view angle determining module for i) determining, based on the position information for the first viewer and for at least a first pixel area of the multi-view display, a respective view angle $\alpha_{1i}$ for each view $V_{1i}$ of the first multi-view media content. The respective view angles define a first viewer cone displaying the views of the first multi-view media content onto the first viewer. In an embodiment, i=1 ... N and N≥5. The view angle determining module is also for ii) determining, based on the position information for the second viewer and for at least the first pixel area, a respective view angle $\alpha_{2j}$ for each view $V_{1j}$ of the first multi-view media content or for each view $V_{2j}$ of a second multi-view media content. In an embodiment, j=1 ... M and M≥5. The respective view angles define a second viewer cone displaying the views of the first multi-view media content or the second multi-view media content onto the second viewer. The multi-view display controller further comprises an output module for outputting media data of the first media content or of the first multi-view media content and the second media content together with information of the respective view angles $\alpha_{1i}$, $\alpha_{2j}$ to the multi-view display for display of the first multi-view media content or for simultaneous display of the first multi-view media content and the second multi-view media content.

A further aspect of the embodiments relates to a multi-view display system comprising a multi-view display controller according to above and a positioning device connected to the multi-view display controller and configured to generate position information and forward the position information to the multi-view display controller.

Yet another aspect of the embodiments relates to a computer program comprising instructions, which when executed by at least one processor, cause the at least one processor to receive media data of at least a first media content. The at least one processor is also caused to receive, from a positioning device and for each viewer of at least a first viewer and a second viewer, position information representing a position of the viewer relative to a multi-view display. The at least one processor is further caused to determine, based on the position information for the first viewer and for at least a first pixel area of the multi-view display, a respective view angle $\alpha_{1i}$ for each view of the first multi-view media content. The respective view angles define a first viewer cone displaying the views of the first multi-view media content onto the first viewer. In an embodiment, i=1 ... N and N≥5. The at least one processor is additionally caused to determine, based on the position information for the second viewer and for at least the first pixel area, a respective view angle $\alpha_{2j}$ for each view $V_{1j}$ of the first multi-view media content or for each view $V_{2j}$ of a second multi-view media content. In an embodiment, j=1 ... M and M≥5. The respective view angles define a second viewer cone displaying the views of the first multi-view media content or the second multi-view media content onto the second viewer. The at least one processor is further caused to output media data of the first media content or of the first multi-view media content and the second media content together with information of the respective view angles $\alpha_{1i}$, $\alpha_{2j}$ to the multi-view display for display of the first multi-view media content or for simultaneous display of the first multi-view media content and the second multi-view media content.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

A further aspect of the embodiments relates to a multi-view display control method comprises receiving media data of at least a first multi-view media content. The method also comprises receiving, from a positioning device and for each viewer of at least a first viewer and a second viewer, position information representing a position of the viewer relative to a multi-view display. The method further comprises determining, based on the position information for the first viewer and for at least a first pixel area of the multi-view display, a respective view angle $\alpha_{1i}$ for each view $V_{1i}$ of the first multi-view media content. The respective view angles define a first viewer cone displaying the views of the first multi-view media content onto the first viewer. In an embodiment, i=1 ... N and N≥5. The method additionally comprises determining, based on the position information for the second viewer and for at least the first pixel area, a respective view angle $\alpha_{2j}$ for each view $V_{1j}$ of the first multi-view media content or for each view $V_{2j}$ of a second multi-view media content. In an embodiment, j=1 . . . M and M≥5. The respective view angles define a second viewer cone displaying the views of the first multi-view media content or the second multi-view media content onto the second viewer. The method further comprises outputting media data of the first media content or of the first multi-view media content and the second media content together with information of the respective view angles $\alpha_{1i}$, $\alpha_{2j}$ to the multi-view display for display of the first multi-view media content or for simultaneous display of the first multi-view media content and the second multi-view media content.

The embodiments make use of a viewer cone for each viewer together with tracking the position of the viewer relative to a multi-view display. As a consequence, the viewer cone can be centered on the viewer's head but allow the viewer to move the head slightly to look around objects and thereby achieve a true 3D experience. In this way each viewer will get a feeling that they are sitting in the sweet spot and every viewer will see the displayed scenes as if looking into the middle camera.

BRIEF DESCRIPTION OF THE DRAWINGS

The embodiments, together with further objects and advantages thereof, may best be understood by making reference to the following description taken together with the accompanying drawings, in which:

FIGS. 3A and 3B illustrate display of multi-view media content in multiple viewer cones according to an embodiment;

FIGS. 6A and 6B schematically illustrate update of a viewer cone in response to movement of a viewer according to an embodiment;

FIG. 7 schematically illustrates defining sub-cones with different view density within a viewer cone according to an embodiment;

FIGS. 10A and 10B schematically illustrate defining a shared viewer cone according to an embodiment;

FIG. 11 is a schematic block diagram of a multi-view display controller according to an embodiment;

FIG. 12 is a schematic block diagram of a multi-view display controller according to another embodiment;

FIG. 13 is a schematic block diagram of a multi-view display controller according to a further embodiment;

FIG. 14 illustrates a user terminal (UE) according to an embodiment together with a computer program product and computer program according to an embodiment;

FIG. 15 is a flow chart illustrating a multi-view display control method according to an embodiment;

FIG. 16 is a flow chart illustrating an additional, optional step of the method illustrated in FIG. 15;

FIG. 17 is a flow chart illustrating additional, optional steps of the method illustrated in FIG. 15;

FIG. 18 is a flow chart illustrating an embodiment of determining view angles in FIG. 15;

DETAILED DESCRIPTION

Throughout the drawings, the same reference numbers are used for similar or corresponding elements.

The embodiments generally relate to multi-view display control, and in particular to controlling display of multi-view media content on a multi-view display. The embodiments enable display of multi-view media content on the multi-view display for individual viewers watching the multi-view display. This is achieved by determining respective view angles defining a so-called viewer cone for each viewer. Such a technology allows multi-view media contents to be displayed so that each viewer sees the media content from the direction intended by the content creator.

Figure 2:
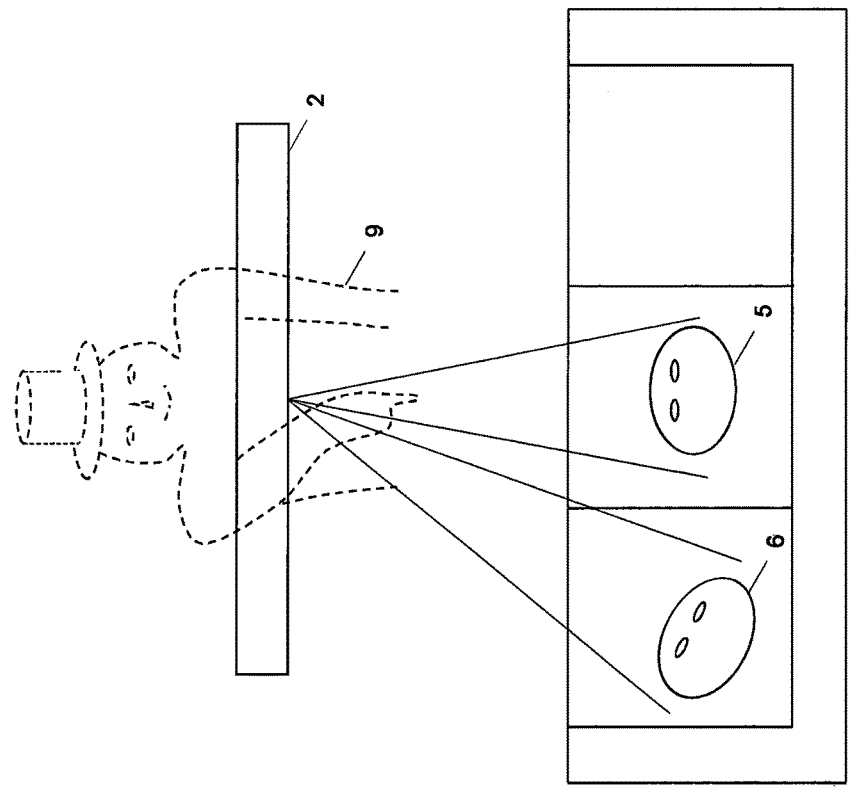
FIG. 2 illustrates a multi-view display displaying multi-view media content recorded using the camera rig of FIG. 1.

FIGS. 3A and 3B illustrate a situation corresponding to FIG. 2 but whereas the prior art technology of FIG. 2 has problems with storytelling, the present embodiments enable each viewer 5, 6 to get the same or similar experience of the displayed scene 9 irrespective of where they are sitting in front of the multi-view display 2. The scene 9 as presented on the multi-view display 2 for the viewers 5, 6 in FIG. 2 implies that central views showing Uncle Sam from the front can only be seen by the viewer 5 situated right in front of the multi-view display 2. A viewer 6 positioned slightly off-center from the middle of the multi-view display screen 2 will instead see side views of the scene 9, i.e. will see Uncle Sam from the side.

The embodiments in clear contrast determine view angles for the different views of the multi-view media content so that the middle views are preferably projected onto each viewer 5, 6 as shown in FIGS. 3A and 3B. This means that also the off-center viewer 6 will see and experience the scene 9 from the front (FIG. 3B) in the same way as the viewer 5 sitting right in front of the multi-view display 2 (FIG. 3A).

Multi-view media content as used herein encompasses any media content or data that can be presented on a multi-view display, such as video content or pictures, regardless of the storage location or the provider of the media content. For instance, the multi-view media content could be video content provided by a TV channel provider. Alternatively, the multi-view media content could be video data or streams locally stored on a memory of a computer, set-top box, multi-view display system or other entity at the home of the viewer. Hence, also different media content streams, possibly originating from different sources, such as recorded by a video camera, downloaded or streamed from the Internet, etc., could be regarded as multi-view media content according to the embodiments. Thus, also live media streamed from a media source, such as media server or video camera, is regarded as multi-view media content of the embodiments.

In a particular embodiment, the media content is preferably multi-view media content. Hence, the media content, such as video data, comprises data representing different views that can be presented on the multi-view display at different view angles in order to present a true 3D experience to the viewers.

Figure 4:
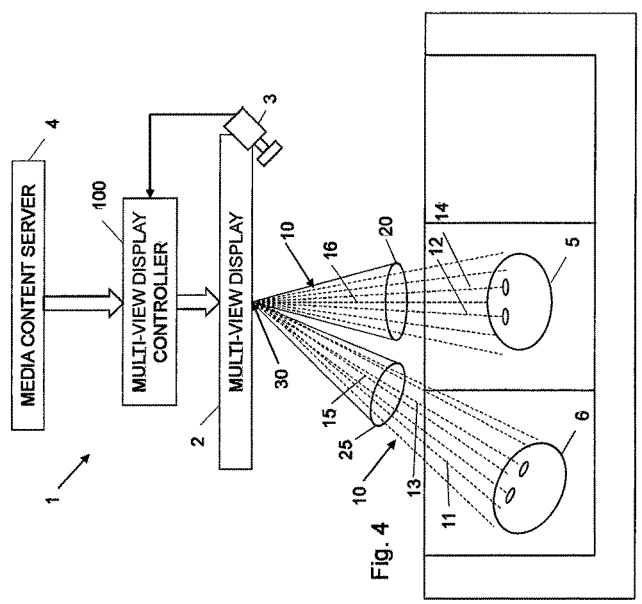
FIG. 4 is a schematic overview of a multi-view display system according to an embodiment.

FIG. 4 schematically illustrates a multi-view display system 1 according to an embodiment. The multi-view display system 1 generally comprises a multi-view display controller 100 connectable to a multi-view display 2. A positioning device 3 is connectable to the multi-view display controller 100 and is operable to generate position information representing respective positions of viewers 5, 6 relative to the multi-view display 2.

In an optional embodiment, the multi-view display system 1 also comprises or is at least connectable, wirelessly and/or via a wired connection, to a media content server 4. The media content server 4 is then operable to provide media data of at least a first multi-view media content to the multi-view display controller 100. The media content server 4 could be a remote server of a media or TV channel provider or a local TV or media server, e.g. a memory storing different media content streams or data or streaming media content streams or data.

Entities of the multi-view display system 1, i.e. the multi-view display 2, the positioning device 3 and optionally the media content server 4, are connectable to the multi-view display controller 100. The connections could be implemented as wireless connections, wired connections or combinations of wired and wireless connections.

An aspect of the embodiments relates to a multi-view display controller 100 configured to receive media data of at least a first media content 10. The multi-view display controller 100 is also configured to receive, from a positioning device 3 and for each viewer 5, 6 of at least a first viewer 5 and a second viewer 6, position information representing a position of the viewer 5, 6 relative to a multi-view display 2. The multi-view display controller 100 is further configured to determine, based on the position information for the first viewer 5 and for at least a first pixel area 30 of the multi-view display 2, a respective view angle $\alpha_{1i}$ for each view $V_{1i}$ 12, 14, 16 of the first multi-view media content 10. The respective view angles define a first viewer cone 20 displaying the views 12, 14, 16 of the first multi-view media content 10 onto the first viewer 5. In an embodiment, i=1 ... N (i=1 to N) and N≥5. The multi-view display controller 100 is additionally configured to determine, based on the position information for the second viewer 6 and for at least the first pixel area 30, a respective view angle $\alpha_{2j}$ for each view $V_{1j}$ 11, 13, 15 of the first multi-view media content 10 or for each view $V_{2j}$ of a second multi-view media content. In an embodiment, j=1 ... M and M≥5. The respective view angles define a second viewer cone 25 displaying the views 11, 13, 15 of the first multi-view media content 10 or the second multi-view media content onto the second viewer 6. The multi-view display controller 100 is further configured to output media data of the first multi-view media content 10 or of the first multi-view media content 10 and the second multi-view media content together with information of the respective view angles $\alpha_{1i}$, $\alpha_{2j}$ to the multi-view display 2 for display of the first multi-view media content 10 or for simultaneous display of the first multi-view media content 10 and the second multi-view media content.

In FIG. 4 only three views 12, 14, 16, 11, 13, 15 per viewer 5, 6 and viewer cone 20, 25 have been assigned reference numbers in order to simplify the drawing.

Thus, the multi-view display controller 100 is configured, operative or adapted to determine view angles defining a respective viewer cone 20, 25 for each viewer 5, 6 in order to direct and project the multi-view media content 10 towards the respective viewer 5, 6. This means that each viewer 5, 6 is able to see the multi-view media content 10 from the front irrespective of whether the viewer 5 is sitting right in front of the multi-view display 2 or the viewer 6 is sitting off-center.

The first viewer 5 and the second viewer 6 could be watching the same first multi-view media content 10. In such a case, the multi-view display controller 100 receives media data of the first multi-view media content 10. Alternatively, the first viewer 5 could be watching the first multi-view media content 10, whereas the second viewer 6 is watching another or a second multi-view media content. In the latter case, the multi-view display controller 100 receives media data of the first multi-view media content 10 and of the second multi-view media content.

The multi-view display controller 100 has access to, as received from the positioning device 3, position information of each viewer 5, 6 watching the multi-view display 2. This means that the multi-view display controller 100 can use the position information to determine the respective position of the viewers 5, 6 relative to the multi-view display 2. This position information therefore enables the multi-view display controller 100 to determine which view angles to project media data in order for the multi-view media content 10 to reach the viewers 5, 6. Thus, the multi-view display controller 100 can use the position information to determine, for the at least first pixel area 30 of the multi-view display 2, the view angles projecting first multi-view media content 10 towards the first viewer 5 and projecting the first or second multi-view media content 10 towards the second viewer 6.

The view angles determined by the multi-view display controller 100 for a viewer 5, 6 based on the position information as received from the positioning device 3 preferably define a view angle for a central view 15, 16 of the multi-view media content 10 to project the central view 15, 16 towards the center of the viewer 5, 6. Correspondingly, view angles for left views 11, 12 are preferably determined to project these left views 11, 12 towards the left part of the viewer 5, 6 and view angles for right views 13, 14 are preferably determined to project the right views 13, 14 towards the right part of the viewer 5, 6. These view angles determined for a viewer 5, 6 collectively define a viewer cone 20, 25 encompassing, for the at least first pixel area 30, the views 12, 14, 16, 11, 13, 15 of the multi-view display content 10 that are projected towards the viewer 5, 6. As a consequence, each viewer 5, 6 can see the multi-view media content 10 as intended from the front.

In FIG. 4, the views 12, 14, 16 encompassed by the viewer cone 20 for the first viewer 5 have been assigned different reference numbers as compared to the views 11, 13, 15 encompassed by the viewer cone 25 for the second viewer 6. However, it could be possible, if both viewers 5, 6 are watching the same first multi-view media content 10, that the views 12, 14, 16 encompassed in the viewer cone 20 for the first viewer 5 are typically the same as the views 11, 13, 15 encompassed by the viewer cone 25 for the second viewer 6. In such a case, the view 12 of the first multi-view media content 10 projected towards a left eye of the first viewer 5 could be the same as the view 11 of the first multi-view media content 10 projected towards a left eye of the second viewer 6. Correspondingly, the view 14 of the first multi-view media content 10 projected towards a right eye of the first viewer 5 could be the same as the view 13 of the first multi-view media content 10 projected towards a right eye of the second viewer 6. Alternatively, the two viewers 5, 6 could be positioned slightly different with regard to the center of his/her viewer cone 20, 25. In such a case, the viewers 5, 6 could be watching different views 11, 12, 13, 14 of first multi-view media content 10 depending on the particular position of the viewer 5, 6 within the viewer cone 20, 25.

If the viewers 5, 6 are watching different multi-view media content 10 they will of course be watching different views.

Information of the determined view angles are output together with the media data of the first multi-view media content 10 or the first and second multi-view media content to the multi-view display 2. This means that the information instructs and controls the multi-view display 2 to project media data of the first multi-view media content 10 within the viewer cone 20 towards the first viewer 5 and project media data of the first or second multi-view media content within the viewer cone 25 towards the second viewer 6.

Figure 5:
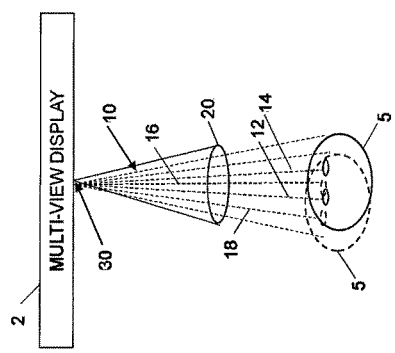
FIG. 5 schematically illustrates movement of a viewer within a viewer cone according to an embodiment.

In a particular embodiment, each viewer cone 20, 25 preferably encompasses at least five different views 12, 14, 16, 11, 13, 15 with different view angles $\alpha_{1i}$, $\alpha_{2j}$ with i=1 ... N≥5 and j=1 ... M and M≥5, such as $\alpha_{11}$-$\alpha_{15}$, $\alpha_{21}$-$\alpha_{25}$. In such a case, the viewer 5, 6 can move his/her head slightly within the viewer cone 20, 25 to see different views 12, 14, 16, 11, 13, 15 and thereby look around objects of the multi-view media content 10 to get a true 3D experience. FIG. 5 schematically illustrates this concept for the first viewer 5. In a first position relative to the multi-view display 2 the first viewer 5 sees a first view 12 of the first multi-view media content 10 with his/her left eye and sees a second view 14 of the first multi-view media content 10 with his/her right eye. If the viewer 5 moves his/her head slightly, to the left in FIG. 5, the left eye of the viewer 5 will see a third view 18 of the first multi-view media content 10 and the right eye will see a fourth view 16 of the first multi-view media content 10 within the viewer cone 20. This means that the viewer 5 will experience a true 3D experience of the first multi-view media content 10 by moving around within the viewer cone 20 to see different views 12, 14, 16, 18 of the first multi-view media content 10.

Figure 1:
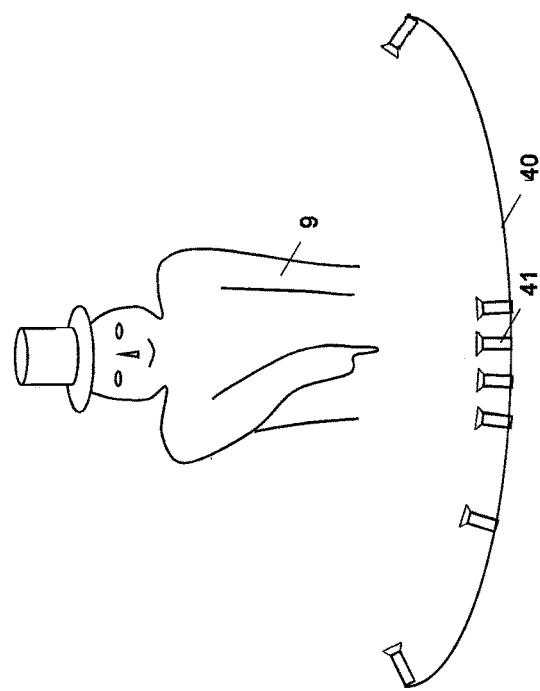
FIG. 1 schematically illustrates a camera rig recording a scene according to prior art techniques.

It is generally preferred to include more than five views 12, 14, 16, 11, 13, 15 per viewer cone 20, 25 to get a more satisfactory 3D experience for the viewers 5, 6. However, increasing the number of views also increases the amount of media data that need to be provided to the multi-view display controller 100 and decoded and displayed on the multi-view display 2. The embodiments can, however, achieve a very satisfactory display of multi-view media content with significantly fewer views and cameras as compared to prior art technology as shown in FIG. 1. In most practical applications, at least about 5-10, such as 5-50 different views 12, 14, 16, 11, 13, 15 per viewer cone 20, 25 will be sufficient to get a true 3D experience for the viewer 5, 6. Generally, if the views 12, 14, 16, 11, 13, 15 are dense enough to have at least two views per pupil width of the eyes of the viewers 5, 6 then it is possible for the viewers 5, 6 to focus on the virtual picture instead of on the multi-view display 2. Assuming that a pupil has a diameter of 1 mm and a viewer cone 20, 25 has a width of 30 cm then a number of views equal to 2×300/1=600 views would be advantageous. However, also a lower number of views are possible, such as 5-50, e.g. 30-50 views in order to get a smooth experience of looking around corners.

Figure 8:
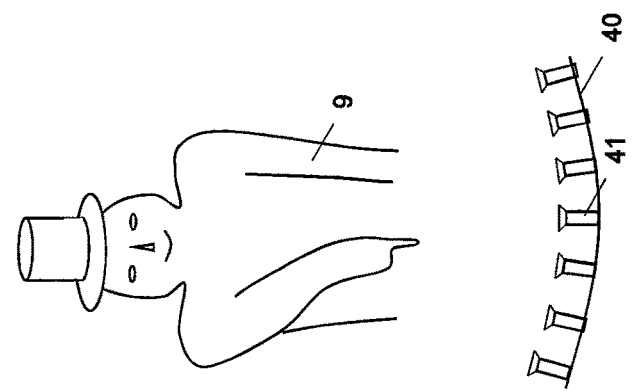
FIG. 8 schematically illustrates a camera rig recording a scene according to an embodiment.

Even if quite a few views 12, 14, 16, 11, 13, 16 can be used according to the embodiments, significant advantageous are still obtained as compared to prior art solutions. Thus, by comparing FIG. 1 (prior art camera set-up) and FIG. 8 (camera set-up according to an embodiment) one sees that the camera rig 40 of the embodiments does not need to cover the full 180 degrees relative to the scene 9. For instance, it might be sufficient to have a coverage of merely 10 degrees for a typical viewer cone 20, 25. This further means that having access to a predefined number of cameras 41 per camera rig 40 implies that the cameras 41 are placed closer to each other in FIG. 8 as compared to FIG. 1. This further implies that neighboring cameras 41 on the camera rig 40 will capture the scene 9 from similar camera views. This further means that pictures captured by neighboring cameras 41 in FIG. 8 are more similar to each other as compared to pictures captured by neighboring cameras 41 in FIG. 1. Hence, the compression of the pictures from such cameras 41 will be more efficient as compared to using spaced-apart cameras 41.

In an embodiment, the multi-view display controller 100 preferably refrains from updating the view angles of the views 12, 14, 16, 11, 13, 15 encompassed by the viewer cone 20, 25 of the viewer 5, 6 when the viewer 5, 6 moves slightly within the viewer cone 20, 25 to see other views 12, 14, 16, 11, 13, 15 of the multi-view media content 10. However, if the viewer 5 moves to a new position in front of the multi-view display 2, the multi-view display controller 100 preferably updates the view angles to thereby realign or redirect the views 12, 14, 16, 11, 13, 15 encompassed by the viewer's viewer cone 20, 25 to thereby anew center the viewer cone 20, 25 towards the viewer 5, 6. This preferred operation of the multi-view display controller 100 will be further discussed here below. In the described embodiments, it is assumed that it is the viewer cone 20 and view angles for the first viewer 5 that are updated. A similar procedure can of course be performed also or alternatively for the second viewer 6 to thereby update the viewer cone 25 and view angles for the second viewer 6.

Movement of a viewer 5, 6 relative to the multi-view display 2 could involve displacement of the viewer 5, 6 to a new watching position relative to the multi-view display 2 and/or rotating the viewer and in particular his/her head relative to the multi-view display 2.

In an embodiment, the multi-view display controller 100 is configured to determine, based on the position information for the first viewer 5 and upon a trigger event, the respective view angle $\alpha_{1i}$ for each view $V_{1i}$ 12, 14, 16 of the first multi-view media content 10 for at least the first pixel area 30. Hence, a determination of the view angles, including an update of the view angles to determine updated view angles, is performed by the multi-view display controller 100 upon or based on a trigger event. There are several variants of trigger events that could cause the multi-view display controller 100 to determine the view angles as described herein.

Hence, upon the trigger event the multi-view display controller 100 uses updated or current position information as received from the positioning device 3 and representing updated or current position of the first viewer 5 relative to the multi-view display 2 to determine the (updated) view angles. In such a case, it could be possible that the first viewer 5 is situated substantially in the same position as he/she was sitting the last time the multi-view display controller 100 determined view angles. The determined view angles will then be the same as the previously determined view angles. However, if the first viewer 5 has moved since the last trigger event then the position information will represent the new position of the first viewer 5. The multi-view display controller 100 will thereby determine new or updated view angles based on the position information and these new or updated view angles or at least a portion thereof will typically be different from the previous view angles. Hence, the position, i.e. direction, of the viewer cone 20 will be updated for at least the first pixel area 30. FIGS. 6A and 6B illustrate this situation. FIG. 6A represents an initial or previous position of the first viewer 5 relative to the multi-view display 2. The view angles of the views 12, 14 of the first multi-view media content 10 are determined to direct the views towards the first viewer 5, which thereby is typically centered within the viewer cone 20. At a next trigger event the first viewer 5 has moved to a new position relative to the multi-view display 2 as shown in FIG. 6B. At this point the multi-view display controller 100 uses position information representing this new position and received from the positioning device 3 to anew determine view angles for the views 12, 14 of the first multi-view media content 10. The views 12, 14 are projected from the first pixel area 30 along the determined view angles to thereby direct the first multi-view media content 10 towards the first viewer 5 at the new position. Hence, the direction of the viewer cone 20 has been updated from the situation in FIG. 6A to the situation in FIG. 6B.

The update of the view angles and the viewer cone 20 from the situation in FIG. 6A to the situation in FIG. 6A is preferably done over a period of time so that the first viewer 5 will experience a smooth transition of the update of viewer cone direction rather than an abrupt redirection of the viewer cone 20. Hence, in an embodiment the multi-view display controller 100 is configured to update the view angles and the viewer cone direction over a predefined time period. For instance, if the previous position of the viewer cone 20 covers the view angle range $\alpha_n$ to $\alpha_{n+k}$ and the updated position corresponds to the view angle range $\alpha_m$ to $\alpha_{m+k}$ and the update is to be conducted over a time period oft s, then the multi-view display controller 100 could updated the view angles for the viewer cone 20 with $(\alpha_m - \alpha_n)/t$ angles per seconds.

In an embodiment, the trigger event is the expiration of a timer. This means that the view angles for the views 12, 14, 16 of the first multi-view media content 10 and thereby the position of the viewer cone 20 for the first viewer 5 are preferably periodically determined and possibly updated. Thus, once the timer has expired the multi-view display controller 100 determines anew the view angles based on updated or current position information as received from the positioning device 3 and reflecting the updated or current position of the first viewer 5 relative to the multi-view display 2. The multi-view display controller 100 is thereby, in this embodiment, configured to determine, based on the position information for the first viewer 5 and upon expire of a timer, the respective view angle $\alpha_{1i}$ for each view $V_{1i}$ 12, 14, 16 of the first multi-view media content 10 for at least the first pixel area 30.

The timer could have any predefined value to get a periodic update of the view angles to realign the viewer cone 20 towards the first viewer 5 if needed. For instance, the value of the timer could be around 10 s as an illustrative but non-limiting example.

In a related embodiment, the multi-view display controller 100 starts the timer when the multi-view display controller 100 determines that the first viewer 5 has moved to a new viewing position as determined by comparing current position information of the first viewer 5 with previously recorded position information of the first viewer 5. Once the timer has expired, the multi-view display controller 100 determines the view angles based on the current position information as received from the positioning device 3 and reflecting the updated or current position of the first viewer 5 relative to the multi-view display 2. Thus, the start of the timer in this embodiment is the detection of a movement of the first viewer 5 relative to the multi-view display 2. The update of the viewer cone and the trigger event is the expiration of the timer.

The above described embodiments using the expiration of a timer as trigger event might in some situations lead to a noticeable change in the display of the first multi-view media content 10 for the first viewer 5. Thus, the determination of new view angles might cause a realignment of the viewer cone 20 so that the first viewer 5 will suddenly see new views of the first multi-view media content 10 as compared to immediately prior to the realignment of the viewer cone 20.

In another embodiment, any realignment of the viewer cone 20 and determination of new view angles are preferably coordinated to occur at occasions causing the least noticeable effect to the watching first viewer 5. For instance, the determination of new view angles can be synchronized to scene cuts in the first multi-view media content 10. At such scene cuts there will be a significant change in the displayed media content so that any realignment of the viewer cone 20 and update of view angles will be masked by the scene cut and typically not noticeable by the first viewer 5.

Hence, in such an embodiment the Multi-view display controller 100 is preferably configured to determine, based on the position information for the first viewer 5 and upon detection of a scene cut in the first multi-view media content 10, the respective view angle $\alpha_{1i}$ for each view $V_{1i}$ 12, 14, 16 of the first multi-view media content 10 for at least the first pixel area 30.

Detection of a scene cut in the first multi-view media content 10 can be performed according to various embodiments. There are several algorithms available in the art for scene cut detection, also referred to as shot transition detection or simply shot detection in the art. Typically, a scene cut algorithm operates in two steps:

1) scoring—in which each pair of consecutive video frames is given a score representing similarity/dissimilarity between the two video frames; and
2) decision—in which calculated scores are evaluated and a cut is detected if the score is considered to represent sufficient dissimilarity.

Several different types of scores can be used, of which sum of absolute differences (SAD), histogram differences (HD) and edge change ratio (ECR) are common. The decision, i.e. step 2) in the scene cut detection algorithm, typically involves comparing the score with a threshold. Both fixed thresholds and adaptive thresholds have been used in the art.

In an embodiment, the multi-view display controller 100 has access to a scene cut detection algorithm that operates on video frames or pictures of the input multi-view media content in order to detect any scene cuts.

In another embodiment, the input multi-view media content can contain indications marking video frames or pictures as coinciding with scene cuts. For instance, a flag can be included for the video frames indicating whether the video frame is coinciding with a scene cut or not. The multi-view display controller 100 then preferably investigates the value of such indications, such as flags, for instance included in the header portion of the video frames, of the multi-view media content in order to detect any scene cuts.

The synchronization of viewer cone realignment with scene cuts can be combined with the previously described embodiments using expiration of a timer to update viewer angles and viewer cone direction. For instance, the viewer cone realignment could be synchronized to occur at the first scene cut following expiration of the timer.

In a further embodiment, the multi-view display controller 100 could be configured to perform the update of view angles and viewer cone direction when the first viewer 5 is looking away from the multi-view display 2. In such a case, the positioning device 3 or the multi-view display controller 100 has access to face or eye recognition algorithm that analyzes a picture taken of the first viewer 5. If the processing of the positioning information defines that the eyes of the first viewer 5 are currently turned away from the multi-view display 2 the multi-view display controller 100 can perform the update of the view angles and viewer cone 20 for the first viewer 5.

A further alternative trigger event is a viewer cone update signal. In such an embodiment, the multi-view display controller 100 is configured to determine, based on the position information for the first viewer 5 and upon reception of a viewer cone update signal, the respective view angle $\alpha_{1i}$ for each view $V_{1i}$ 12, 14, 16 of the first multi-view media content 10 for at least the first pixel area 30.

Various types of such viewer cone update signal are possible and within the scope of the embodiments. For instance, the multi-view display controller 100 can be connected to a microphone or other sound detecting sensor. In such a case, the first viewer 5 could make a defined voice command when he/she would like the multi-view display controller 100 to update the view angles and realign the viewer cone 20. The microphone or other sound detecting sensor detects this defined voice command and outputs, based on the detection, the viewer cone update signal to the multi-view display controller 100.

In another example, the positioning device 3 or a camera connected to the multi-view display controller 100 could monitor the first viewer 5 in order to detect when the first viewer 5 makes a defined movement that indicates that the first viewer 5 would like the multi-view display controller 100 to update view angles and realign the viewer cone 20. Non-limiting examples of defined movement could be raising or moving the viewer's arm; moving the head in a defined pattern, such as nodding; moving the eye lids in a defined pattern, such as blinking a defined number of time, etc. When the positioning device 3 or camera detects the defined movement it generates the viewer cone update signal and forwards it to the multi-view display controller 100.

A further example is if the first viewer 5 has access to a device that he/she can activate in order to signal to the multi-view display controller 100 that he/she would like to update and realign the viewer cone 20. The device could be any device that can be used within the multi-view display system 1 and that can communicate, preferably wirelessly, with the multi-view display controller 100. The device could, for instance, be a remote control including dedicated or general remote controls that can be used by the first viewer 5 to control operation of the multi-view display controller 100. Alternatively, the device could be a portable device, such as mobile telephone, smart phone, tablet, laptop, etc. that comprises a computer program, module or application allowing the portable device to be used for generating the viewer cone update signal upon activation of the portable device by the first viewer 5, for instance by pushing a button or activating a touch sensitive screen of the portable device.

In the above described embodiments, the multi-view display controller 100 preferably updates the view angles for the views 12, 14, 16 of the first multi-view media content 10 and thereby the viewer cone 20 at one or more defined trigger events. This means during the period of time between such trigger events the first viewer 5 can move his/her slightly within the viewer cone 20 as shown in FIG. 5 in order to see other views 12, 14, 16, 18 of the first multi-view media content 10 to get a true 3D experience of the media content.

In another embodiment the multi-view display controller 100 could be regarded as continuously updating the viewer cone 20 but then preferably at a lower rate than the rate of change of the position of the first viewer 5 relative to the multi-view display 2. In such a case, the multi-view display controller 100 can slowly adapt the view angles and the viewer cone 20 when the first viewer 5 moves to a new viewing position relative to the multi-view display 2 but still allow the first viewer 5 to temporarily move his/her head slightly to look around objects in the displayed media content as shown in FIG. 5.

Hence, the multi-view display controller 100 should, in this embodiment, preferably allow the first viewer 5 to move his/her head to watch other views 12, 14, 16, 18 of the first multi-view video content 10 without updating view angles and realigning the viewer cone 20. In clear contrast, an update of view alignments and realignment of the viewer cone 20 are preferably performed when the first viewer 5 indeed has moved to a new viewing position in front of the multi-view display 2. This technology is based on the concept that when the first viewer 5 moves his/her within the viewer cone 20 as shown in FIG. 5, for instance in order to look around corners, he/she soon returns to substantially the same viewing position as prior to the temporary movement. However, if the first viewer 5 moves to a new viewing position, such as switching seats in a sofa or moving from a sitting position to a lying position, the viewer 5 will remain in that new viewing position for a significant longer period of time as compared to the temporary movement within the viewer cone 20.

In an embodiment, the multi-view display controller 100 is thereby configured to determine, based on the position information for the first viewer and at a lower rate than a rate of change of the position of the first viewer 5 relative to the multi-view display, the respective view angle $\alpha_{1i}$ for each view $V_{11}$ 12, 14, 16 of the first multi-view media content 10 for at least the first pixel area 30.

In an implementation example, the multi-view display controller 100 could limit the update of the view angles and the viewer cone 20 to a maximum rate. For instance, the multi-view display controller 100 allows a change in view angles of maximum 1/X degrees per Y video frames regardless of how quickly the first viewer 5 moves or changes positions. As a non-limiting example of values for X and Y, the multi-view display controller 100 could limit the change in view angles to a maximum of 1/100 degree per video frame.

In another or complementary implementation example, the multi-view display controller 100 uses averaging of position informations to lower the rate at which view angles and viewer cone 20 can be updated. The multi-view display controller 100 is then configured to calculate average position information based on P position informations received from the positioning device 3 and representing positions of the first viewer 5 relative to the multi-view display at P≥2 different time instances. The multi-view display controller 100 is also configured to determine, based on the average position information and for at least the first pixel area 30, the respective view angle $\alpha_{1i}$ for each view $V_{1i}$ 12, 14, 16 of the first multi-view media content 10.

This means that if the first viewer 5 temporarily moves the head slightly to see other views of the first multi-view media content 10 and then moves back to the original position then most of the position informations will represent this original position if the averaging window is big enough. Hence, any update of the view angles and viewer cone 20 will be slight and might even not be noticeable if the first viewer 5 moves back his/her head quickly.

The value of the parameter P is preferably dependent on the frame or picture rate of the multi-view media content. For instance, assume a frame rate of 60 frames per seconds and that the averaging takes 10 seconds to change position completely, then P could have a value of 10×60=600 as an illustrative but non-limiting example.

A further implementation example is to update view angles and the viewing cone 20 only if the first viewer 5 has remained at the new viewing position for at least a minimum amount of time. The multi-view display controller 100 is then preferably configured to compare Q position informations for the first viewer 5 received from the positioning device 3 and representing positions of the first viewer 5 relative to the multi-view display 2 at Q≥2 different time instances. The multi-view display controller 100 is also configured to determine, if the Q position informations differ from each other with less than a maximum position difference and based on the position information for the first viewer 5, the respective view angle $\alpha_{1i}$ for each view $V_{1i}$ 12, 14, 16 of the first multi-view media content 10 for at least the first pixel area 30.

Thus, in this embodiment the multi-view display controller 100 preferably compares Q position informations with each other, preferably the Q latest position informations obtained from the positioning device for the first viewer 5. If the Q position informations represent substantially the same position of the first viewer 5 relative to the multi-view display 2, i.e. differ from each other with less than the maximum position difference, then the multi-view display controller 100 preferably determines new view angles and updates the viewer cone 20 for the first viewer 5. Thus, the first viewer 5 needs to be present in the new viewing position during the time it takes for the positioning device 3 to record at least Q position informations. This means that if the viewer 5 moves his/her head slightly as shown in FIG. 5 and then shortly moves back to the original position then he/she will probably not remain in the new viewing position for sufficient time corresponding to recording Q position informations. Accordingly, no update of viewing angles or viewer cone 20 should be performed.

However, if the first viewer 5 moves to a new viewing position and remains there a sufficient amount of time for the positioning device 3 to record Q position informations then the multi-view display controller 100 determines new view angles and thereby updates the viewer cone 20 for the first viewer 5.

In an embodiment, the multi-view display controller 100 is configured to determine the view angles based on the most recent of the Q position informations if the Q position informations differ from each other less than the maximum position difference. In another embodiment, the multi-view display controller 100 is configured to determine the view angles based on an average of the Q position informations or at least a portion thereof.

In another embodiment, the multi-display controller 100 defines a zone around the head of the first viewer 5. If the first viewer 5 moves so that his/her head comes outside of the zone then a timer is started as discussed in the foregoing. Once the timer has expired the multi-view display controller 100 uses updated position information of the first viewer 5 to determine whether the first viewer 5 has moved back so that his/her head is anew within the zone. In such a case, no update of the view angles and viewer cone 20 is performed for the first viewer 5. However, if the first viewer 5 has not moved back to have the head within the zone at the expiration of the timer then the multi-view display controller 100 determines updated view angles and viewer cone direction for the first viewer 5.

In a further embodiment, multi-view display controller 100 does not perform any update of view angles and viewer cone direction as long as the first viewer 5 has his/her head still within the viewer cone 20. However, if the first viewer 5 continues to move away from the previous viewing position so that the head will move outside of the viewer cone 20 then the multi-view display controller 100 preferably updates view angles and viewer cone direction so that the head of the first viewer 5 always remains with the viewer cone 20.

In a particular embodiment, the present technology makes use of a viewer or virtual cone 20, 25 for every viewer 5, 6. By using head tracking or eye tracking, the multi-view display controller 100 will know where each viewer 5, 6 is situated relative to the multi-view display 2. The multi-view display controller 100 will then create a viewer cone 20, 25 that is centered on the viewer's head, for instance on a point between the eyes. The viewer cone 20, 25 will be more or less stationary. If the viewer 5, 6 moves the head she/he will be able to "look around corners". But if the viewer 5, 6 moves permanently, the viewer cone 20, 25 will follow so that it is centered around the viewer's head again. In an embodiment, the middle of the viewer cone 20 will preferably always show the view from the middle camera in the camera rig. This way everyone who is watching will get the feeling that they are sitting in the sweet spot, and everyone will feel as if the actor is talking to them if they look into the middle camera. This is exemplified in FIGS. 3A and 3B.

Compared to the traditional stereo 3D video that you have at the movies or at home today, one advantage of the present technology is that you do not need any glasses. Also, when the viewer moves his/her head, the image does not "follow the viewer" in an unnatural way as happens with stereo 3D video, instead the media content behaves as you would expect, and the viewer can look around corners, objects, etc.

Compared with traditional fixed-cone multi-view displays, there are no fixed sweet spots. With a fixed-cone multi-view display the viewer can really only sit or stand in certain fixed positions in order to avoid cone-crossing problems. In practice it is hard to find any position that gives a good 3D effect, even if the viewer searches for a good sweet spot.

Compared to a single-cone multi-view display such as the ones from Holografika, there are several advantages of the present technology. First, a much smaller camera rig 40 is needed, as is shown in FIG. 8 as compared to FIG. 1. The reason is that the smaller camera rig 40 only has to cover the views within the viewer cone of the viewer, not the full 180 degree perspective. If the width of the viewer cone is, say, four head wide, then the camera rig 40 need also only be that big. The smaller size of the camera rig 40 makes it easier to move, operate and calibrate and it can also make the camera rig 40 lighter and less expensive.

Another great advantage is that the amount of data produced from such a camera rig is much smaller. This makes storage and transmission of material less costly.

Yet another advantage of the present technology is that it solves the storytelling problem. Every viewer is getting the "best seat", in the "middle of the action", in the sweet spot of his/her own personal viewer cone.

Most of the times the viewer's head is likely to be in the middle of the viewer cone 20. This can be exploited in different ways. For instance, the density of the views displayed towards the viewer 5 can be higher in the central part of the viewer cone 20 as compared to peripheral parts of the viewer cone 20. This concept is indicated in FIG. 7. Hence, in an embodiment the multi-view display controller 100 is configured to define a central portion 22 of the first viewer cone 20 and a peripheral portion 24A, 24B, 26A, 26B of the first viewer cone 20 based on the position information for the first viewer 5. The multi-view display controller 100 is also configured to determine, at a first view density in terms of number of views per view angle range, respective view angles for views of the first multi-view media content 10 to be displayed onto the first viewer 5 within the central portion 22 of the first viewer cone 20. The multi-view display controller 100 is further configured to determine, at a second view density that is lower than the first view density, respective view angles for views of the first multi-view media content 10 to be displayed onto the first viewer 5 within the peripheral portion 24A, 24B, 26A, 26B of the first viewer cone 20.

In a particular embodiment, the multi-view display controller 100 is configured to define a left peripheral portion 24A, 26A and a right peripheral portion 24B, 26B in addition to the central portion 22. The multi-view-display controller 100 is in this embodiment also configured to determine, at the second view density, respective view angles for views of the first multi-view media content 19 to be displayed onto the first viewer 5 within the left peripheral portion 24A, 26A and the right peripheral portion 24B, 26B of the first viewer cone 20.

Thus, in this embodiment a higher view density in terms of number of views per view angle range is used for the central portion 22 of the viewer cone 20 as compared to the peripheral portions 24A, 24B, 26A, 26B. The reason of having a higher view density is that the 3D experience of the first viewer 5 will generally improve with view density. For instance, if the view density is high enough so that the first viewer 5 will see at least two views per pupil width then it is possible for the first viewer to focus on 3D objects in the displayed scene. If the view density is slightly lower the focusing effect might be lost but it could still be possible to see in stereo and look around corners and objects.

In an embodiment, the multi-view display controller 100 defines a central portion 22 and a left and a right peripheral portion. In another embodiment, the multi-view display controller 100 defines a central portion 22, a left intermediate or first peripheral portion 24A, a right intermediate or first peripheral portion 24B, a left (second) peripheral portion 26A and a right (second) peripheral portion 26B. The view density could then be highest at the central portion 22, at an intermediate level at the intermediate or first peripheral portions 24A, 24B and lowest at the (second) peripheral portions 26A, 26B.

One possibility would then be to have more than two views per pupil width in the area where the eyes of the first viewer 5 are likely to be, i.e. in the central portion 22 of the first viewer cone 20, making it possible for the viewer 5 to focus on objects in the scene. Outside this central portion 22, fewer views could be used within the intermediate or first peripheral portions 24A, 24B. The viewer 5 would lose the focusing effect but would still be able to see in stereo and look around corners. In the absolute edge of the first viewer cone, i.e. the (second) peripheral portions 26A, 26B, it may be the case that even the stereo effect is lost. Hence if the viewer 5 moves quickly out of the first viewer cone 20, all that would happen would be a graceful degradation of the image to something that looks no worse than a 2D video.

Instead of or as a complement to use different view densities the present technology can make good understanding of where the viewer's head is likely to be within the viewer cone with regard to using different levels of quality for different views. Most of the time the head will be in the middle of the viewer cone. This means that it is possible to increase the quality of these views at the cost of more peripheral views which are less likely to be watched by the viewer. As an example, it is possible to spend more bits on the central views than on the views at the periphery.

Usage of different view densities as described above can be used independent on realigning viewer cones of the embodiments. Hence, a particular aspect of the embodiments defines a multi-view display controller configured to receive media data of a multi-view media content. The multi-view display controller is also configured to determine, at a first view density in terms of number of views per view angle range, respective view angles for views of the multi-view display content to be displayed on a multi-view display within a central portion of a viewer cone. The multi-view display controller is further configured to determine, at a second view density that is lower than the first view density, respective view angles for views of the multi-view media content to be displayed on the multi-view display within a peripheral portion of the viewer cone. The multi-view display controller is additionally configured to output media data of the multi-view media content together with information of the respective view angles to the multi-view display for display of the multi-view media content.

With reference to FIG. 4, between the two viewer cones 20, 25 nobody is watching the multi-view display 2, and therefore it is not crucial what is displayed there. In principle the multi-view display 2 could show black in these directions, perhaps saving energy and making the room dimmer for increased contrast. However, when a viewer walks out of the room, it would be nice for the viewer to be able to see an image. Since the viewer is moving fast then it may not be advisable to let the viewer cone follow the viewer, which could cause nausea. Instead it could be possible to show the view from the middle camera in these angles. That would mean that the multi-view display 2 would mimic a 2D display for viewers who are walking. Another possibility would be to replicate the latest view, for instance the rightmost view in the viewer cone 25 for the second viewer 6 and the leftmost view in the viewer cone 20 for the first viewer 5. That would mean that there is a "seam" in between where the image will look very strange. However, media content is still presented in these directions from the at least first pixel area 30 of the multi-view display 2. Yet another possibility is to track a walking viewer and show the central view to both his/her eyes. This would also mean that walking viewers would see a 2D display.

Figure 9B:
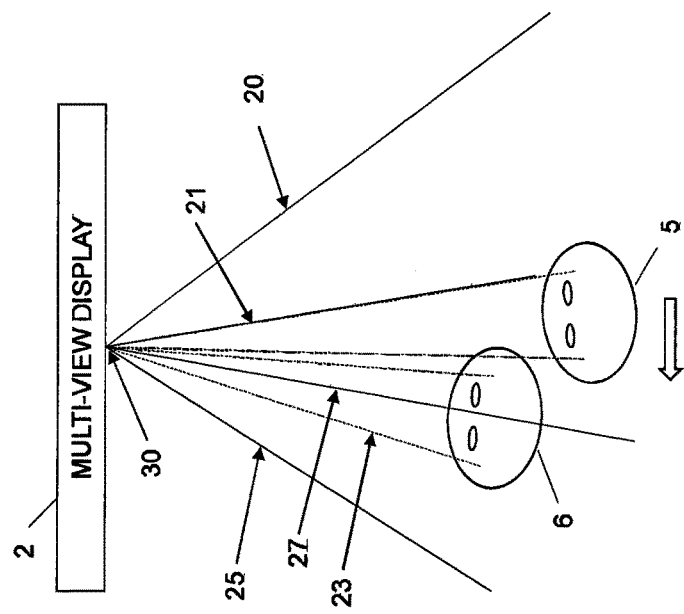
FIGS. 9A and 9B schematically illustrate partly overlapping viewer cones according to embodiments.
Figure 9A:
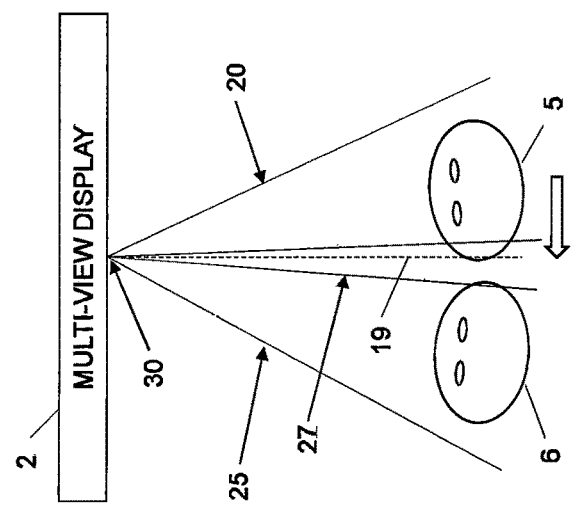

In some cases viewers 5, 6 watching the multi-view display 2 sit so close together so that their respective viewer cones 20, 25 would intersect in an overlap portion 27 as shown in FIG. 9A. In such a case, the multi-view display controller 100 preferably determines what should be displayed in the overlap portion 27. Generally, the viewers 5, 6 are typically not watching the view 19 displayed in the overlap portion 27. This means that it most often does not matter whether the view or views 19 present within this overlap portion 29 is or are view or views from the first viewer cone 20 of the first viewer 5 or view or views from the second viewer cone 25 of the second viewer 6. It is only when a viewer 5, 6 quickly moves his/her head to look around an object that the viewer 5, 6 may see the peripheral view or views 19 that could be present in the overlap portion 27. Hence, a solution may be for the multi-view display controller 100 to detect which of the first and second viewer 5, 6 that moves to the overlap portion 27 and then display the view or views 19 in the overlap portion according to this viewer's viewer cone 20, 25. As an example, if the first viewer 5 would move the head quickly towards the left as shown by the arrow in FIG. 9A, the multi-view display controller 100 would detect this movement based on the position information from the positioning device 3 and thereby display one or more views according to the multi-view media content in the first viewer cone 20 of the first viewer 5. Likewise, if instead the second viewer 6 moved his/her head quickly to the right, the overlap portion 27 would display one or more views of the multi-view media content in the second viewer cone 25 of the second viewer 6.

Thus, in an embodiment the first viewer cone 20 and the second viewer cone 25 at least partly overlap in an overlap portion 27. The multi-view display controller 100 is then configured to determine if one of the first viewer 5 and the second viewer 6 is moving towards the overlap portion 27 based on the position information for the first viewer 5 and the position information for the second viewer 6. The multi-view display controller 100 is also configured to determine, for any view angles within the overlap portion 27, views 19 of multi-view media content 10 currently displayed onto the one of the first viewer 5 and the second viewer 6.

This means that the multi-view display controller 100 selects the view(s) 19 to be displayed within the overlap portion 27 to match and correspond to views within the viewer cone 20 of the viewer 5 that is moving towards the overlap portion 27.

In an embodiment, the multi-view display controller 100 controls the display of media content so that each viewer 5, 6 always gets a view from his/her own viewer cone 20, 25 to both the left and the right eye even if there is an overlap between viewer cones 20, 25. This is solved in the following by defining an "eye cone" 21, 23 for each viewer 5, 6. In an embodiment, the eye cone 21, 23 is not necessarily in the center of the viewer's viewer cone 20, 25, instead it is preferably at all times defined as the cone that covers both of the viewer's eyes. In the example in FIG. 9B, the first viewer 5 has quickly moved his/her head to the left in order to see around a corner, and the first viewer cone 20 has not yet had time to follow. The eye cone 21 of the first viewer 5 is deep into the second viewer cone 25 of the second viewer 6. Yet the multi-view display controller 100 can detect that the eye cones 21, 23 of the first viewer 5 and the second viewer 6 do not overlap. Hence, the multi-view display controller 100 can allocate the views so that views from the first viewer cone 20 are shown in the eye cone 21 of the first viewer 5, views from the second viewer cone 25 are shown in the eye cone 23 of the second viewer 6, and outside of the eye cones 21, 23 it does not matter so much.

Eye cones 21, 23 can also overlap. For instance, if one person is sitting on a chair, and another person is standing behind him or her, as shown in FIG. 10A. In this case it is not straightforward to select which viewer 5, 6 to prioritize. A solution is then to merge the two viewers' viewer cones as indicated in FIG. 10B. Merging the two viewers' viewer cones into a shared viewer cone 29 means that it is typically not possible to center the shared viewer cone 29 perfectly for both viewers 5, 6. This means that neither viewer 5, 6 or only one of the viewers 5, 6 will get to be in the sweet spot to see the media content from straight ahead, but both will be quite close to the sweet spot.

Thus, in an embodiment the first viewer cone 20 and the second viewer cone 25 at least partly overlap in an overlap portion 27. The multi-view display controller 100 is then configured to define, based on the position information for the first viewer 5 and for at least the first pixel area 30, view angles within the first viewer cone 20 forming a first eye cone 21. The multi-view display controller 100 is also configured to define, based on the position information for the second viewer 6 and for at least the first pixel area 30, view angles within the second viewer cone 25 forming a second eye cone 23. The multi-view display controller 100 is further configured to define, if the first eye cone 21 and the second eye cone 23 at least partly overlap, a shared viewer cone 29 encompassing the view angles $\alpha_{1i}$ and the view angles $\alpha_{2j}$. The multi-view display controller 100 is additionally configured to determine a respective view of the first multi-view media content for each view angle within the shared viewer cone 29.

This means that if the eye cones 21, 23 of the two viewers 5, 6 overlap as shown in FIG. 10A the multi-view display controller 100 preferably forms the so-called shared viewer cone 29 and displays, within this shared viewer cone 29, views of the first multi-view media content. The two viewers 5, 6 will both be very close to the center of the shared viewer cone 29 since otherwise their eye cones 21, 23 would not overlap. This further means that both viewers 5, 6 will watch center views and thereby see the displayed scene as looking, at least close to, straight ahead towards the scene.

It is preferably also possible to split a shared viewer cone 29 if the two viewers 5, 6 subsequently move apart so that their respective eye cones 21, 23 no longer overlap. In such a case, separate viewer cones 20, 25 are once more determined for the two viewers 5, 6 as described herein.

The pixel area 30 of the multi-view display 2 can be defined according to various embodiments.

In a first embodiment, a pixel area 30 constitutes a column of pixels of the multi-view display 2. The column could be one pixel in width but extend over the whole height of the multi-view display 2. Alternatively, the column could have a width of multiple, i.e. at least two, consecutive pixels while having a height corresponding to the whole height of the multi-view video display 2.

In some multi-view displays 2, the pixel pattern is tilted slightly. This is generally an implementation issue and enables a reduction of the need for pixel density in the X-direction by borrowing from the Y-direction. In such a case, a pixel column could then be a tilted column of pixels that align to the general tilted pixel pattern of the multi-view display 2.

In a second embodiment, a pixel area 30 constitutes a row of pixels of the multi-view display 2. The row could be one pixel in height but extend over the width of the multi-view display 2. Alternatively, the row could have a height of multiple consecutive pixels while having a width corresponding to the whole width of the multi-view video display 2. In another embodiment, the pixel area 30 can be delimited by edges that run vertically and preferably horizontally, i.e. the pixel area 30 does not need to be aligned with the tilted pixel pattern.

In a third embodiment, a pixel area 30 constitutes a block of pixels of the multi-view display 2, such as a block of A×B pixels, wherein A,B are integers larger than or equal to one.

The multi-view display controller is, in an embodiment, preferably configured to calculate the view angles based on a respective depth of the viewer relative to the multi-view display and based on a respective distance of the viewer in a direction parallel to the direction along a main extension, such as the width, of the multi-view display relative to a predefined point on the multi-view display. In this embodiment, the depths and distances are obtained based on the position information. In an embodiment, the predefined point on the multi-view display is the upper left corner of the multi-view display. This should, however, merely be seen as an illustrative but non-limiting example and any corner or indeed any other predefined point of the multi-view display could be used as reference point for defining the distance and depth.

The depths and distances could be determined by the multi-view display controller based on the position information received from the positioning device. Alternatively, the position information itself contains the depth and distance values so that the multi-view display controller simply retrieves them from the received position information.

Another aspect of the embodiments relates to a multi-view display system 1, see FIG. 4, comprising the multi-view display controller 100 and a positioning device 3 connected to the multi-view display controller 100 and configured to generate the position information and forward the position information to the multi-view display controller 100.

In an embodiment, the positioning device 3 is a camera 3. In such a case, the camera 3 is configured to estimate a respective position of each viewer 5, 6 of the multiple viewers 5, 6 relative to the multi-view display 2. The camera 3 is preferably also configured to generate the respective position information based on the estimated respective positions.

Generally, the positioning device 3 of the multi-view display system 1 can be any sensor, camera or other positioning equipment capable of tracking a viewer 5, 6, such as tracking the eyes of a viewer 5, 6, and find the positions of the viewer 5, 6, such as of each eye of the viewer 5, 6. The positioning device 3 preferably tracks the 3D position of the viewer 5, 6, such as of each eye of the viewer 5, 6, relative to a fixed or predefined reference point, such as a predefined point of the multi-view display 2.

Finding the 3D position of the viewer 5, 6 or the eye 5, 6 can be accurately done by a sensor, such as the Kinect® sensor used by Xbox® One game console. This sensor creates a high resolution image of the viewer 5, 6 and uses a time-of-flight system to estimate the distance from the sensor in every pixel in the high resolution image. By using face and eye detection the sensor can find the eyes of the viewer 5, 6 in the high resolution image and by using the time-of-flight data the sensor can calculate how far away the eyes are. Hence, the 3D positions of the eyes can be obtained.

There are other sensors and positioning devices available on the marked that use similar or different techniques than the Kinect® sensor in order to be able to generate the position information of the present embodiments. For instance, special glasses with infrared (IR) reflecting dots on them could be detected and filmed by IR cameras in order to generate the position information.

In an embodiment, the multi-view display system 1 also comprises the multi-view display 2 connected to the multi-view display controller 100.

In an embodiment, the present technology uses a multi-view display in combination with viewer tracking in order to give every viewer his/her own personal viewer cone. The embodiments preferably update the viewer cones in a slow fashion or based on selected trigger events in order to allow the viewers to look around corners.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 12 illustrates a particular hardware implementation of the multi-view display controller 200. The multi-view display controller 200 comprises, in this embodiment, a data input 210 configured to receive the media data. An information input 220 of the multi-view display controller 200 is configured to receive the position information from the positioning device 3. A controller 230 is configured to determine the respective view angle $\alpha_{1i}$ and the respective view angle $\alpha_{2j}$. The multi-view display controller 200 preferably also comprises a data output 240 configured to output the media data together with the information of the respective view angles $\alpha_{1i}$, $\alpha_{2j}$.

The data input 210 of the multi-view display controller 200 is preferably wirelessly connected or connected by wire to the media content server to thereby be able to receive media data of the available media contents. The data input 210 is also connected to the controller 230 to forward the media data to the controller 230.

The information input 220 is connected to the positioning device and receives the position information therefrom. The information input 220 is connected to the controller 230 to forward the received position information and position selection information to the controller 230.

The data input 210 and the information input 220 could be in the form of input ports, receivers or transceivers as non-limiting examples.

The controller 230 is connected to the data output 240 in order to forward the received media data and the determined view angles or information of the determined view angles to the data output 240. The data output 240 is in turn connected to the multi-view display for forwarding the information thereto.

The data output 240 could be in the form of an input port, transmitter or transceiver as non-limiting examples.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the multi-view display controller 100 comprises a processor 110 and a memory 120, see FIG. 11. The memory 120 comprises instructions executable by the processor 110, wherein the processor 110 is operative to receive the media data and the position information from the positioning device. The processor 110 is also operative to determine the respective view angle $\alpha_{1i}$ and the respective view angle $\alpha_{2j}$. The processor 110 is further operative to output the media data together with the information of the respective view angles $\alpha_{1i}$, $\alpha_{2j}$.

FIG. 14 is a schematic block diagram illustrating an example of a user equipment (UE) 400 comprising a processor 410 and an associated memory 420.

In this particular example, at least some of the steps, functions, procedures, modules and/or blocks described herein are implemented in a computer program 430, which is loaded into the memory 420 for execution by processing circuitry including one or more processors 410. The processor 410 and memory 420 are interconnected to each other to enable normal software execution. An optional input/output device may also be interconnected to the processor 410 and/or the memory 420 to enable input and/or output of relevant media data, position information and information of view angles.

The user equipment 400 can be any device or apparatus that can be present in a multi-view display system 1 and connected to a multi-view display. For instance, the user equipment 400 could be a computer, either stationary or portable, such as laptop, a tablet, a set-up box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program 430 comprises instructions, which when executed by at least one processor 410, cause the at least one processor 410 to receive media data of at least a first media content. The at least one processor 410 is also caused to receive, from a positioning device and for each viewer of at least a first viewer and a second viewer, position information representing a position of the viewer relative to a multi-view display. The at least one processor 410 is further caused to determine, based on the position information for the first viewer and for at least a first pixel area of the multi-view display, a respective view angle $\alpha_{1i}$ for each view $V_{1i}$ of the first multi-view media content. The respective view angles define a first viewer cone displaying the views of the first multi-view media content onto the first viewer. In an embodiment, i=1 . . . N and N is equal to or larger than five. The at least one processor 410 is additionally caused to determine, based on the position information for the second viewer and for at least the first pixel area, a respective view angle $\alpha_{2j}$ for each view $V_{1j}$ of the first multi-view media content or for each view $V_{2j}$ of a second multi-view media content. In an embodiment, j=1 . . . M and M≥5. The respective view angles define a second viewer cone displaying the views of the first multi-view media content or the second multi-view media content onto the second viewer. The at least one processor 410 is further caused to output media data of the first media content or of the first multi-view media content and the second media content together with information of the respective view angles $\alpha_{1i}$, $\alpha_{2j}$ to the multi-view display for display of the first multi-view media content or for simultaneous display of the first multi-view media content and the second multi-view media content.

The proposed technology also provides a carrier 440 comprising the computer program 430. The carrier 440 is one of an electronic signal, an optical signal, an electromagnetic signal, a magnetic signal, an electric signal, a radio signal, a microwave signal, or a computer-readable storage medium 440.

By way of example, the software or computer program 430 may be realized as a computer program product, which is normally carried or stored on a computer-readable medium 440, preferably non-volatile computer-readable storage medium 440. The computer-readable medium 440 may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program 430 may thus be loaded into the operating memory of a computer or equivalent processing device, represented by the user equipment 400 in FIG. 9, for execution by the processor 410 thereof.

The flow diagram or diagrams presented herein may therefore be regarded as a computer flow diagram or diagrams, when performed by one or more processors. A corresponding multi-view display controller may be defined as a group of function modules, where each step performed by the processor corresponds to a function module. In this case, the function modules are implemented as a computer program running on the processor. Hence, the multi-view display controller may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 13.

FIG. 13 is a schematic block diagram of a multi-view display controller 300 with function modules. The multi-view display controller 300 comprises a data input module 310 or means for receiving media data of at least a first media content. The multi-view display controller 300 also comprises an information input module 320 or means for receiving, from a positioning device and for each viewer of at least a first viewer and a second viewer, position information representing a position of the viewer relative to a multi-view display. The multi-view display controller 300 further comprises a view angle determining module 330 or means for i) determining, based on the position information for the first viewer and for at least a first pixel area of the multi-view display, a respective view angle $\alpha_{1i}$ for each view $V_{1i}$ of the first multi-view media content. The respective view angles define a first viewer cone displaying the views of the first multi-view media content onto the first viewer. In an embodiment, i=1 . . . N and N≥5. The view angle determining module 330 or means is also for ii) determining, based on the position information for the second viewer and for at least the first pixel area, a respective view angle $\alpha_{2j}$ for each view $V_{1j}$ of the first multi-view media content or for each view $V_{2j}$ of a second multi-view media content. In an embodiment, j=1 . . . M and M≥5. The respective view angles define a second viewer cone displaying the views of the first multi-view media content or the second multi-view media content onto the second viewer. The multi-view display controller 300 further comprises an output module 340 of means for outputting media data of the first media content or of the first multi-view media content and the second media content together with information of the respective view angles $\alpha_{1i}$, $\alpha_{2j}$ to the multi-view display for display of the first multi-view media content or for simultaneous display of the first multi-view media content and the second multi-view media content.

FIG. 15 is flow chart illustrating a multi-view display control method according to an embodiment. The method comprises receiving, in step S1, media data of at least a first multi-view media content. Step S2 comprises receiving, from a positioning device and for each viewer of at least a first viewer and a second viewer, position information representing a position of the viewer relative to a multi-view display. The method also comprises determining, in step S3, based on the position information for the first viewer and for at least a first pixel area of the multi-view display, a respective view angle $\alpha_{1i}$ for each view of the first multi-view media content. The respective view angles define a first viewer cone displaying the views of the first multi-view media content onto the first viewer. In an embodiment, i=1 . . . N and N≥5. A corresponding step S4 comprises determining, based on the position information for the second viewer and for at least the first pixel area, a respective view angle $\alpha_{2j}$ for each view $V_{1j}$ of the first multi-view media content or for each view $V_{2j}$ of a second multi-view media content. In an embodiment, j=1 . . . M and M≥5. The respective view angles define a second viewer cone displaying the views of the first multi-view media content or the second multi-view media content onto the second viewer. The method further comprises outputting, in step S6, media data of the first media content or of the first multi-view media content and the second media content together with information of the respective view angles $\alpha_{1i}$, $\alpha_{2j}$ to the multi-view display for display of the first multi-view media content or for simultaneous display of the first multi-view media content and the second multi-view media content.

The multi-view display control method is preferably performed by a multi-view display controller as schematically illustrated in FIG. 15.

In the following various implementation embodiments of step S3 will be further described. These implementation embodiments can alternatively, or in addition, be applied to step S4 depending on for which viewer the view angles are to be determined.

In an implementation embodiment steps S3 comprises determining, based on the position information for the first viewer and upon a trigger event, the respective view angle $\alpha_{1i}$ for each view $V_{1i}$ of the first multi-view media content for at least the first pixel area.

In another implementation embodiment step S3 comprises determining, based on the position information for the first viewer and upon expire of a timer, the respective view angle $\alpha_{1i}$ for each view $V_{1i}$ of the first multi-view media content for at least the first pixel area.

In a further implementation embodiment step S3 comprises determining, based on the position information for the first viewer and upon detection of a scene cut in the first multi-view media content, the respective view angle $\alpha_{1i}$ for each view $V_{1i}$ of the first multi-view media content for at least the first pixel area.

In yet another implementation embodiment step S3 comprises determining, based on the position information for the first viewer and upon reception of a viewer cone update signal, the respective view angle $\alpha_{1i}$ for each view $V_{1i}$ of the first multi-view media content for at least the first pixel area.

In a further implementation embodiment step S3 comprises determining, based on the position information for the first viewer and at a lower rate than a rate of change of the position of the first viewer relative to the multi-view display, the respective view angle $\alpha_{1i}$ for each view $V_{1i}$ of the first multi-view media content for at least the first pixel area.

An implementation embodiment comprises an additional step as shown in FIG. 16. The method then continues from step S2 of FIG. 15. A next step S10 comprises calculating average position information based on P position informations received from the positioning device and representing positions of the first viewer relative to the multi-view display at P≥2 different time instances. The method then continues to step S3 in FIG. 15, which comprises determining, based on the average position information and for at least the first pixel area, the respective view angle $\alpha_{1i}$ for each view $V_{1i}$ of the first multi-view media content.

Another implementation embodiment comprises at least one additional step as shown in FIG. 17. The method then continues from step S2 of FIG. 15. A next step S20 comprises comparing Q position informations for the first viewer received from the positioning device and representing positions of the first viewer relative to the multi-view display at Q≥2 different time instances. An optional step S21 comprises determining whether the Q position informations differ from each other less than a maximum position difference. If the answer is yes the method continues to step S3 of FIG. 15, which comprises determining, if the Q position informations differ from each other with less than the maximum position difference and based on the position information for the first viewer, the respective view angle $\alpha_{1i}$ for each view of the first multi-view media content for at least the first pixel area. However, if the Q position informations differ from each other as determined in step S21 then no view angles are preferably determined for the first viewer and the method continues to step S4 or S5 in FIG. 15.

FIG. 18 is a flow chart illustrating an additional step S30 and an implementation embodiment of step S3 in FIG. 15. The method continues from step S2 in FIG. 15. A next step S30 comprises defining a central portion of the first viewer cone and a peripheral portion of the first viewer cone based on the position information for the first viewer. Step S31 comprises determining, at a first view density in terms of number of views per view angle range, respective view angles for views of the first multi-view media content to be displayed onto the first viewer within the central portion of the first viewer cone. Step S32 comprises determining, at a second view density that is lower than the first view density, respective view angles for views of the first multi-view media content to be displayed onto the first viewer within the peripheral portion of the first viewer cone. The method then continues to step S4 in FIG. 15.

Figure 19:
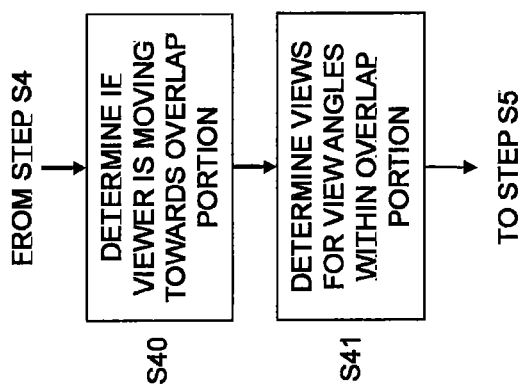
FIG. 19 is a flow chart illustrating additional, optional steps of the method illustrated in FIG. 15.

FIG. 19 is a flow chart illustrating additional optional steps of the method in FIG. 15 in the case of overlapping viewer cones. Hence, in this embodiment the first viewer cone and the second viewer cone at least partly overlap in an overlap portion. The method continues from step S4 in FIG. 15. A next step S40 comprises determining if one of the first viewer and the second viewer is moving towards the overlap portion based on the position information for the first viewer and the position information for the second viewer. A next step S41 comprises determining, for any view angles within the overlap portion, views of multi-view media content currently displayed onto the one of the first viewer and the second viewer. The method then continues to step S5 in FIG. 15.

Figure 20:
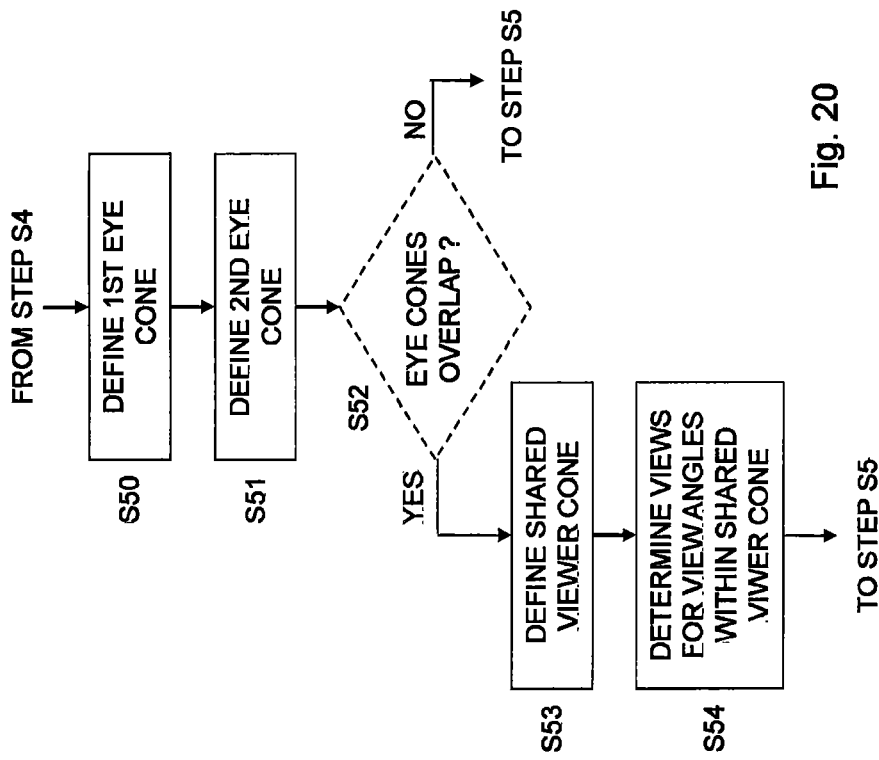
FIG. 20 is a flow chart illustrating additional, optional steps of the method illustrated in FIG. 15.

FIG. 20 is another flow chart illustrating additional optional steps of the method in FIG. 15 in the case of overlapping viewer cones. Hence, in this embodiment the first viewer cone and the second viewer cone at least partly overlap in an overlap portion. The method continues from step S4 in FIG. 15. A next step S50 comprises defining, based on the position information for the first viewer and for at least the first pixel area, view angles within the first viewer cone forming a first eye cone. Step S51 comprises defining, based on the position information for the second viewer and for at least the first pixel area, view angles within the second viewer cone forming a second eye cone. An optional step S52 comprises determining whether the two eye cones overlap. If they at least partly overlap the method continues to step S53, which comprises defining a shared viewer cone encompassing the view angles $\alpha_{1i}$ and the view angles $\alpha_{2j}$. A next step S54 comprises determining a respective view of the first multi-view media content for each view angle within the shared viewer cone. The method then continues to step S5 in FIG. 15.

If the eye cones do not overlap as determined in the optional step S52 the method continues to step S5 in FIG. 15.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A multi-view display controller comprising processing circuitry and a memory coupled to the processing circuitry, wherein the processing circuitry is configured by computer readable instructions in the memory to:
   receive media data of at least a first multi-view media content;
   receive, from a positioning device and for each viewer of at least a first viewer and a second viewer, position information representing a position of said viewer relative to a multi-view display;
   determine, based on said position information for said first viewer and for at least a first pixel area of said multi-view display, a respective view angle $\alpha_{1i}$ for each view $V_{1i}$ of said first multi-view media content, said respective view angles defining a first viewer cone displaying said views of said first multi-view media content onto said first viewer, wherein i=1 . . . N and N≥;
   determine, based on said position information for said second viewer and for at least said first pixel area, a respective view angle $\alpha_{2j}$ for each view $V_{1j}$ of said first multi-view media content or for each view $V_{2j}$ of a second multi-view media content, said respective view angles defining a second viewer cone displaying said views of said first multi-view media content or said second multi-view media content onto said second viewer, wherein j=1 . . . M and M≥5;
   output media data of said first multi-view media content or of said first multi-view media content and said second multi-view media content together with information of said respective view angles $\alpha_{1i}$, $\alpha_{2j}$ to said multi-view display for display of said first multi-view media content or for simultaneous display of said first multi-view media content and said second multi-view media content;
   calculate average position information based on P position information received from said positioning device and representing positions of said first viewer relative to said multi-view display at P≥2 different time instances; and
   determine, based on said average position information and for at least said first pixel area said respective view angle $\alpha_{1i}$ for each view $V_{1i}$ of said first multi-view media content.

2. The multi-view display controller according to claim 1, wherein said multi-view display controller is configured to:
   determine, based on said position information for said first viewer and upon a trigger event, said respective view angle $\alpha_{1i}$ for each view $V_{1i}$ of said first multi-view media content for at least said first pixel area.

3. The multi-view display controller according to claim 2, wherein said multi-view display controller is configured to:
   determine, based on said position information for said first viewer and upon expiration of a timer, said respective view angle $\alpha_{1i}$ for each view $V_{1i}$ of said first multi-view media content for at least said first pixel area.

4. The multi-view display controller according to claim 2, wherein said multi-view display controller is configured to:
   determine, based on said position information for said first viewer and upon detection of a scene cut in said first multi-view media content, said respective view angle $\alpha_{1i}$ for each view $V_{1i}$ of said first multi-view media content for at least said first pixel area.

5. The multi-view display controller according to claim 2, wherein said multi-view display controller is configured to:
   determine, based on said position information for said first viewer and upon reception of a viewer cone update signal, said respective view angle $\alpha_{1i}$ for each view $V_{1i}$ of said first multi-view media content and for at least said first pixel area.

6. The multi-view display controller according to claim 1, wherein said multi-view display controller is configured to:
   determine, based on said position information for said first viewer and at a lower rate than a rate of change of said position of said first viewer relative to said multi-view display, said respective view angle $\alpha_{1i}$ for each view $V_{1i}$ of said first multi-view media content for at least said first pixel area.

7. The multi-view display controller according to claim 1, wherein said multi-view display controller is configured to:
   compare Q position information for said first viewer received from said positioning device and representing positions of said first viewer relative to said multi-view display at Q≥2 different time instances; and
   determine, if said Q position information differ from each other with less than a maximum position difference and based on said position information for said first viewer, said respective view angle $\alpha_{1i}$ for each view $V_{1i}$ of said first multi-view media content and for at least said first pixel area.

8. The multi-view display controller according to claim 1, wherein said first viewer cone and said second viewer cone at least partly overlap in an overlap portion, and said multi-view display controller is configured to:
- determine if one of said first viewer and said second viewer is moving towards said overlap portion based on said position information for said first viewer and said position information for said second viewer; and
- determine, for any view angles within said overlap portion, views of multi-view media content currently displayed onto said one of said first viewer and said second viewer.

9. The multi-view display controller according to claim 1, wherein said first viewer cone and said second viewer cone at least partly overlap in an overlap portion, and said multi-view display controller is configured to:
- define, based on said position information for said first viewer and for at least said first pixel area, view angles within said first viewer cone forming a first eye cone;
- define, based on said position information for said second viewer and for at least said first pixel area, view angles within said second viewer cone forming a second eye cone;
- define, if said first eye cone and said second eye cone at least partly overlap, a shared viewer cone encompassing said view angles $\alpha_{1i}$ and said view angles $\alpha_{2j}$; and
- determine a respective view of said first multi-view media content for each view angle within said shared viewer cone.

10. The multi-view display controller according to claim 1, comprising:
- a processor; and
- a memory, said memory containing instructions executable by said processor, wherein said processor is operative to:
  - receive said media data;
  - receive said position information from said positioning device;
  - determine said respective view angle $\alpha_{1i}$;
  - determine said respective view angle $\alpha_{2j}$ and
  - output said media data together with said information of said respective view angles $\alpha_{1i}$, $\alpha_{2j}$.

11. The multi-view display controller according to claim 1, comprising:
- a data input configured to receive said media data;
- an information input configured to receive said position information from said positioning device;
- a controller configured to determine said respective view angle $\alpha_{1i}$ and said respective view angle $\alpha_{2j}$; and
- an output configured to said media data together with said information of said respective view angles $\alpha_{1i}$, $\alpha_{2j}$.

12. A multi-view display system comprising:
- a multi-view display controller according to claim 1; and
- a positioning device connected to said multi-view display controller and configured to generate said position information and forward said position information to said multi-view display controller.

13. The multi-view display system according to claim 12, further comprising a multi-view display connected to said multi-view display controller.

14. A multi-view display controller comprising processing circuitry and a memory coupled to the processing circuitry, wherein the processing circuitry is configured by computer readable instructions in the memory to:
- receive media data of at least a first multi-view media content;
- receive, from a positioning device and for each viewer of at least a first viewer and a second viewer, position information representing a position of said viewer relative to a multi-view display;
- determine, based on said position information for said first viewer and for at least a first pixel area of said multi-view display, a respective view angle $\alpha_{1i}$ for each view $V_{1i}$ of said first multi-view media content, said respective view angles defining a first viewer cone displaying said views of said first multi-view media content onto said first viewer, wherein i=1 . . . N and N≥;
- determine, based on said position information for said second viewer and for at least said first pixel area, a respective view angle $\alpha_{2j}$ for each view $V_{1j}$ of said first multi-view media content or for each view $V_{2j}$ of a second multi-view media content, said respective view angles defining a second viewer cone displaying said views of said first multi-view media content or said second multi-view media content onto said second viewer, wherein j=1 . . . M and M≥5;
- output media data of said first multi-view media content or of said first multi-view media content and said second multi-view media content together with information of said respective view angles $\alpha_{1i}$, $\alpha_{2j}$ to said multi-view display for display of said first multi-view media content or for simultaneous display of said first multi-view media content and said second multi-view media content;
- define a central portion of said first viewer cone and a peripheral portion (24A, 24B, 26A, 26B) of said first viewer cone based on said position information for said first viewer;
- determine, at a first view density in terms of number of views per view angle range, respective view angles for views of said first multi-view media content to be displayed onto said first viewer within said central portion of said first viewer cone; and
- determine, at a second view density that is lower than said first view density, respective view angles for views of said first multi-view media content to be displayed onto said first viewer within said peripheral portion of said first viewer cone.

15. A computer program product comprising a non-transitory computer readable medium storing instructions which, when executed on at least one processor, cause said at least one processor to:
- receive media data of at least a first multi-view media content;
- receive, from a positioning device and for each viewer of at least a first viewer and a second viewer, position information representing a position of said viewer relative to a multi-view display;
- determine, based on said position information for said first viewer and for at least a first pixel area of said multi-view display, a respective view angle $\alpha_{1i}$ for a first plurality of views $V_{1i}$ of said first multi-view media content, said respective view angles defining a first viewer cone displaying said views of said first multi-view media content onto said first viewer, wherein i=1 . . . N and N≥5, each of said first plurality of views $V_{1i}$ corresponding to a different angle from which the media content was captured;
- determine, based on said position information for said second viewer and for at least said first pixel area, a respective view angle $\alpha_{2j}$ for-a second plurality of views $V_{2j}$ of a second multi-view media content, said respective view angles defining a second viewer cone displaying said views of-said second multi-view media content onto said second viewer, wherein j=1 ... M and M≥5, each of said second plurality of views $V_{2j}$ corresponding to a different angle from which the second multi-view media content was captured, wherein said second multi-view media content is different from said first multi-view media content;

output media data of said first multi-view media content and said second multi-view media content together with information of said respective view angles $\alpha_{1i}$, $\alpha_{2j}$ to said multi-view display for simultaneous display of said first multi-view media content and said second multi-view media content;

calculate average position information based on P position information received from said positioning device and representing positions of said first viewer relative to said multi-view display at P≥2 different time instances; and determine, based on said average position information and for at least said first pixel area said respective view angle $\alpha_{1i}$ for each view $V_{1i}$ of said first multi-view media content.

16. A multi-view display control method comprising:

receiving media data of at least a first multi-view media content;

receiving, from a positioning device and for each viewer of at least a first viewer and a second viewer, position information representing a position of said viewer relative to a multi-view display;

determining, based on said position information for said first viewer and for at least a first pixel area of said multi-view display, a respective view angle $\alpha_{1i}$ for a first plurality of views $V_{1i}$ of said first multi-view media content, said respective view angles defining a first viewer cone displaying said views of said first multi-view media content onto said first viewer, wherein i=1 ... N and N≥5, each of said first plurality of views $V_{1i}$ corresponding to a different angle from which the media content was captured;

determining, based on said position information for said second viewer and for at least said first pixel area, a respective view angle $\alpha_{2j}$ for a second plurality of views $V_{2j}$ of a second multi-view media content, said respective view angles defining a second viewer cone displaying said views of-said second multi-view media content onto said second viewer, wherein j=1 ... M and M≥5, each of said second plurality of views $V_{2j}$ corresponding to a different angle from which the second multi-view media content was captured, wherein said second multi-view media content is different from said first multi-view media content;

outputting media data of said first multi-view media content and said second multi-view media content together with information of said respective view angles $\alpha_{1i}$, $\alpha_{2j}$ to said multi-view display for simultaneous display of said first multi-view media content and said second multi-view media content; and calculating average position information based on P position information received from said positioning device and representing positions of said left eye and said right eye of said first viewer relative to said multi-view display at P≥2 different time instances, wherein determining said respective view angle $\alpha_{1i}$ comprises determining, based on said average position information and for at least said first pixel area, said respective view angle $\alpha_{1i}$ for each view $V_{1i}$ of said first multi-view media content.

17. The multi-view display control method according to claim 16, wherein determining said respective view angle $\alpha_{1i}$ comprises determining, based on said position information for said first viewer and upon a trigger event, said respective view angle $\alpha_{1i}$ for each view $V_{1i}$ of said first multi-view media content for at least said first pixel area.

18. The multi-view display control method according to claim 17, wherein determining said respective view angle $\alpha_{1i}$ comprises determining, based on said position information for said first viewer and upon expire of a timer, said respective view angle $\alpha_{1i}$ for each view $V_{1i}$ of said first multi-view media content for at least said first pixel area.

19. The multi-view display control method according to claim 17, wherein determining said respective view angle $\alpha_{1i}$ comprises determining, based on said position information for said first viewer and upon detection of a scene cut in said first multi-view media content, said respective view angle $\alpha_{1i}$ for each view $V_{1i}$ of said first multi-view media content for at least said first pixel area.

20. The multi-view display control method according to claim 17, wherein determining said respective view angle $\alpha_{1i}$ comprises determining, based on said position information for said first viewer and upon reception of a viewer cone update signal, said respective view angle $\alpha_{1i}$ for each view $V_{1i}$ of said first multi-view media content and for at least said first pixel area.

21. The multi-view display control method according to claim 16, wherein determining said respective view angle $\alpha_{1i}$ comprises determining, based on said position information for said first viewer and at a lower rate than a rate of change of said position of said first viewer relative to said multi-view display, said respective view angle $\alpha_{1i}$ for each view $V_{1i}$ of said first multi-view media content or at least said first pixel area.

22. The multi-view display control method according to claim 16, further comprising:

comparing Q position information for said first viewer received from said positioning device and representing positions of said first viewer relative to said multi-view display at Q≥2 different time instances, wherein determining said respective view angle $\alpha_{1i}$ comprises determining, if said Q position information differ from each other with less than a maximum position difference and based on said position information for said first viewer, said respective view angle $\alpha_{1i}$ for each view $V_{1i}$ of said first multi-view media content and for at least said first pixel area.

23. The multi-view display control method according to claim 16, wherein said first viewer cone and said second viewer cone at least partly overlap in an overlap portion, and said method further comprising:

determining if one of said first viewer and said second viewer is moving towards said overlap portion based on said position information for said first viewer and said position information for said second viewer; and determining, for any view angles within said overlap portion, views of multi-view media content currently displayed onto said one of said first viewer and said second viewer.

24. A multi-view display control method comprising:

receiving media data of at least a first multi-view media content;

receiving, from a positioning device and for each viewer of at least a first viewer and a second viewer, position information representing a position of said viewer relative to a multi-view display;

determining, based on said position information for said first viewer and for at least a first pixel area of said multi-view display, a respective view angle $\alpha_{1i}$ for each view $V_{1i}$ of said first multi-view media content, said respective view angles defining a first viewer cone displaying said views of said first multi-view media content onto said first viewer, wherein i=1 . . . N and N≥5;

determining, based on said position information for said second viewer and for at least said first pixel area, a respective view angle $\alpha_{2j}$ for each view $V_{1j}$ of said first multi-view media content or for each view $V_{2j}$ of a second multi-view media content, said respective view angles defining a second viewer cone displaying said views of said first multi-view media content or said second multi-view media content onto said second viewer, wherein j=1 . . . M and M≥5;

outputting media data of said first multi-view media content or of said first multi-view media content and said second multi-view media content together with information of said respective view angles $\alpha_{1i}$, $\alpha_{2j}$ to said multi-view display for display of said first multi-view media content or for simultaneous display of said first multi-view media content and said second multi-view media content;

defining a central portion of said first viewer cone and a peripheral portion of said first viewer cone based on said position information for said first viewer, wherein determining said respective view angle $\alpha_{1i}$ comprises:

determining, at a first view density in terms of number of views per view angle range, respective view angles for views of said first multi-view media content to be displayed onto said first viewer within said central portion of said first viewer cone; and determining, at a second view density that is lower than said first view density, respective view angles for views of said first multi-view media content to be displayed onto said first viewer within said peripheral portion of said first viewer cone.

* * * * *